United States Patent
Takada

(10) Patent No.: US 8,125,592 B2
(45) Date of Patent: Feb. 28, 2012

(54) LIQUID CRYSTAL APPARATUS, COLOR FILTER SUBSTRATE, AND ARRAY SUBSTRATE

(75) Inventor: Akio Takada, Miyagi (JP)

(73) Assignee: Sony Corporation, Tokyo (JP)

( * ) Notice: Subject to any disclaimer, the term of this patent is extended or adjusted under 35 U.S.C. 154(b) by 352 days.

(21) Appl. No.: 12/431,228

(22) Filed: Apr. 28, 2009

(65) Prior Publication Data

US 2009/0290105 A1  Nov. 26, 2009

(30) Foreign Application Priority Data

May 26, 2008  (JP) .................................. 2008-136530

(51) Int. Cl.
 *G02F 1/1335* (2006.01)
(52) U.S. Cl. ......................................................... 349/96
(58) Field of Classification Search ........................ None
 See application file for complete search history.

(56) References Cited

U.S. PATENT DOCUMENTS 4,630,097 A * 12/1986 Marks .............................. 348/58

(Continued)

FOREIGN PATENT DOCUMENTS

| JP | 7-261169 | 10/1995 |
| JP | 8-50205 | 2/1996 |
| JP | 10-300931 | 11/1998 |
| JP | 2000-147253 | 5/2000 |
| JP | 2001-74935 | 3/2001 |
| JP | 2002-372620 | 12/2002 |

(Continued)

OTHER PUBLICATIONS

Tsuyoshi Ohyama, et al., "34.2: TN Mode TFT-LCD with In-cell Polarizer", SID 04 Digest, 2004, pp. 1106-1109.

*Primary Examiner* — Mike Stahl
(74) *Attorney, Agent, or Firm* — Oblon, Spivak, McClelland, Maier & Neustadt, L.L.P.

(57) ABSTRACT

Disclosed is a liquid crystal apparatus including a plurality of dot regions. The liquid crystal apparatus includes a pair of transparent substrates disposed with a gap, a liquid crystal layer sandwiched by the pair of transparent substrates, and a polarizer formed by disposing, on at least one of surfaces of the pair of transparent substrates which are opposed to each other, a polarization layer group constituted of a plurality of polarization layers including an inorganic fine particle layer having a shape anisotropy, the polarization layer group corresponding to one of the dot region and the plurality of dot regions.

5 Claims, 18 Drawing Sheets

U.S. PATENT DOCUMENTS

| | | | |
|---|---|---|---|
| 5,943,156 A * | 8/1999 | Komuro et al. | 359/280 |
| 6,251,297 B1 * | 6/2001 | Komuro et al. | 216/24 |
| 6,765,721 B2 * | 7/2004 | Kawazu et al. | 359/487.06 |
| 6,772,608 B1 | 8/2004 | Drost et al. | |
| 7,019,903 B2 * | 3/2006 | Berger et al. | 359/487.04 |
| 2007/0159577 A1 * | 7/2007 | Atsushi et al. | 349/96 |
| 2008/0129931 A1 * | 6/2008 | Takahashi et al. | 349/96 |
| 2008/0186576 A1 * | 8/2008 | Takada | 359/492 |
| 2009/0004375 A1 * | 1/2009 | Kim et al. | 427/163.1 |
| 2011/0170186 A1 * | 7/2011 | Sawaki | 359/485.01 |

FOREIGN PATENT DOCUMENTS

| | | |
|---|---|---|
| JP | 2005-316105 | 11/2005 |
| JP | 2006-309185 | 11/2006 |
| JP | 2007-148344 | 6/2007 |
| JP | 2008-216956 | 9/2008 |
| WO | WO 2006/104052 A1 | 10/2006 |

* cited by examiner

_LIQUID CRYSTAL APPARATUS, COLOR FILTER SUBSTRATE, AND ARRAY SUBSTRATE_

BACKGROUND OF THE INVENTION

1. Field of the Invention

The present invention relates to a liquid crystal apparatus in which a polarizing plate function is implemented in a liquid crystal cell, and a color filter substrate and an array substrate that are used therefor.

2. Description of the Related Art

Generally, a liquid crystal apparatus is constituted of a liquid crystal cell and a pair of polarizing plates that are disposed therein. In the liquid crystal cell, a pair of electrode substrates sandwiches a liquid crystal layer. The pair of polarizing plates sandwiches the liquid crystal cell. For the polarizing plate, a dichroic polarizing plate obtained by causing a film in related art to contain an iodine or dye-based organic polymeric material is widely used.

In contrast, in recent years, there has been studied a technique in which a polarizing plate function is implemented not outside but inside the liquid crystal cell in order to reduce a thickness and a weight thereof (see, for example, International Publication No. 2006/104052 (paragraphs 0022 and 0060) (hereinafter, referred to as Patent Document 1) and "TN Mode TFT-LCD with In Cell Polarizer", Tsuyoshi Ohyama et al., SID Digest, Vol. 4, p.p. 1106-1109 (hereinafter, referred to as Non-Patent Document 1)). In a case where a polarizer having the polarizing plate function is formed in the liquid crystal cell, Patent Document 1 discloses a technique in which coating is carried out with a polarizer material containing a pigment by a spin coating method, a spray coating method, a bar coating method, a roll coating method, a blade coating method, or the like. Further, Non-Patent Document 1 discloses a technique in which coating is carried out with a polarizer material by a slot die coating.

SUMMARY OF THE INVENTION

However, in a large-sized liquid crystal apparatus such as a liquid crystal television, it is difficult to coat a surface of a substrate with a polarizer material in a uniform thickness by the above-mentioned methods, and it is also difficult to obtain a polarizer having polarization characteristics that are uniform in a plane.

In view of the above-mentioned circumstances, it is desirable to provide a liquid crystal apparatus including a polarizer having polarization characteristics that are uniform in a plane in a liquid crystal cell thereof and to provide a color filter substrate and an array substrate that are used therefor.

According to an embodiment of the present invention, there is provided a liquid crystal apparatus including a plurality of dot regions. The liquid crystal apparatus includes a pair of transparent substrates disposed with a gap, a liquid crystal layer sandwiched by the pair of transparent substrates, and a polarizer formed by disposing, on at least one of surfaces of the pair of transparent substrates which are opposed to each other, a polarization layer group constituted of a plurality of polarization layers including an inorganic fine particle layer having a shape anisotropy, the polarization layer group corresponding to one of the dot region and the plurality of dot regions.

In the embodiment, one polarization layer group is independently provided for each dot region or the plurality of dot regions. Accordingly, even in the liquid crystal apparatus having a large screen such as a large-sized liquid crystal television, it is possible to divide the large screen and form the polarization layers for each divided region. Thus, the liquid crystal apparatus having the polarization characteristics that are uniform in a display surface thereof can be stably obtained. Specifically, when the liquid crystal apparatus is formed by coating an entire screen with polarization elements, it is extremely difficult to form a film uniformly on a surface in a large-sized substrate, and therefore a polarizer having polarization characteristics that are uniform in the surface can hardly be obtained. In contrast, according to the embodiment, one polarization layer group is independently disposed for each dot region and the plurality of dot regions, to thereby divide the entire surface of the substrate into the plurality of regions and dispose the polarization layer for each divided region, with the result that the polarizer can be manufactured. Consequently, the liquid crystal apparatus having the polarization characteristics that are uniform in the surface can be stably obtained.

Further, the liquid crystal apparatus further includes a plurality of colored layers disposed on one of the pair of transparent substrates, the plurality of colored layers corresponding to the plurality of dot regions. The inorganic fine particle layer is formed of an inorganic fine particle that is different depending on colors of the plurality of colored layers.

As described above, by selecting the inorganic fine particle material that is optimum for each color, the polarization characteristics are optimized, with the result that a polarizer having more desirable polarization characteristics can be obtained.

Further, in the liquid crystal apparatus, the plurality of colored layers have colors of red, green, and blue. The inorganic fine particle corresponding to each of the colored layers of red and green contains a Ge component, and the inorganic fine particle corresponding to the colored layer of blue contains a Si component.

As described above, it is desirable that the inorganic fine particle corresponding to each of the colored layers of red and green contains the Ge component and the inorganic fine particle corresponding to the colored layer of blue contains the Si component. With this structure, the liquid crystal apparatus including the polarizer having excellent polarization characteristics can be obtained.

Further, in the liquid crystal apparatus, the plurality of polarization layers each include a reflection layer, a dielectric layer formed on the reflection layer, and the inorganic fine particle layer formed on the dielectric layer.

As described above, by providing the reflection layer, out of light that has entered from the inorganic fine particle layer side, a TE wave that has passed through the inorganic fine particle layer and the dielectric layer is reflected. By providing the dielectric layer so that a phase of the TE wave that has passed through the inorganic fine particle layer and has been reflected by the reflection layer is shifted by a half wavelength, the TE wave reflected by the reflection layer is partially absorbed when passing through the inorganic fine particle layer and partially reflected to return to the reflection layer. In addition, light that has passed through the inorganic fine particle layer is attenuated by interference. Therefore, the TE wave can be selectively attenuated, which improves a contrast.

Further, in the liquid crystal apparatus, the polarizer is disposed on each of the surfaces of the pair of transparent substrates which are opposed to each other.

As described above, by disposing the polarizer having a function of a polarization plate between the pair of transparent substrates, it becomes unnecessary to externally provide the polarization plate in related art. Accordingly, the thickness of the liquid crystal apparatus can be reduced.

Further, the liquid crystal apparatus further includes colored layers of red, green, and blue disposed on one of the pair of transparent substrates, the colored layers corresponding to the dot regions. The inorganic fine particle layer is formed of an inorganic fine particle that contains a Ge component.

As described above, in the case where the same inorganic fine particle is used for all the colors, it is desirable to use the inorganic fine particle containing the Ge component that secures the contrast over an entire visible light range and has a low reflectance.

According to another embodiment, there is provided a color filter substrate including a plurality of dot regions. The color filter substrate includes a transparent substrate, a plurality of colored layers having different colors disposed on one surface of the transparent substrate, the colors of the plurality of colored layers corresponding to the plurality of dot regions, and a polarizer formed by disposing on the one surface a polarization layer group constituted of a plurality of polarization layers including an inorganic fine particle layer having a shape anisotropy, the polarization layer group corresponding to one of the dot region and the plurality of dot regions.

In the embodiment, one polarization layer group is independently provided for each dot region or the plurality of dot regions. Accordingly, even in the color filter substrate used in the liquid crystal apparatus having a large screen such as a large-sized liquid crystal television, it is possible to divide the large screen and form the polarization layers for each divided region. Thus, the liquid crystal apparatus having the polarization characteristics that are uniform in a display surface thereof can be stably obtained. Specifically, when the liquid crystal apparatus is formed by coating an entire screen with polarization elements, it is extremely difficult to form a film uniformly on a surface in a large-sized substrate, and therefore a polarizer having polarization characteristics that are uniform in the surface can hardly be obtained. In contrast, according to the embodiment, one polarization layer group is independently disposed for each dot region and the plurality of dot regions, to thereby divide the entire surface of the substrate into the plurality of regions and dispose the polarization layer for each divided region, with the result that the polarizer can be manufactured. Consequently, the color filter substrate having the polarization characteristics that are uniform in the surface can be stably obtained.

According to another embodiment, there is provided an array substrate. The array substrate includes a transparent substrate, a switching element disposed on one surface of the transparent substrate, a pixel electrode electrically connected with the switching element disposed on the one surface, and a polarizer formed by disposing a polarization layer group constituted of a plurality of polarization layers including an inorganic fine particle layer having a shape anisotropy, the polarization layer group corresponding to one of the pixel electrode and the plurality of pixel electrodes.

In the embodiment, one polarization layer group is independently provided for each dot region or the plurality of dot regions. Accordingly, even in the array substrate used in the liquid crystal apparatus having a large screen such as a large-sized liquid crystal television, it is possible to divide the large screen and form the polarization layers for each divided region. Thus, the liquid crystal apparatus having the polarization characteristics that are uniform in a display surface thereof can be stably obtained. Specifically, when the liquid crystal apparatus is formed by coating an entire screen with polarization elements, it is extremely difficult to form a film uniformly on a surface in a large-sized substrate, and therefore a polarizer having polarization characteristics that are uniform in the surface can hardly be obtained. In contrast, according to the embodiment, one polarization layer group is independently disposed for each dot region and the plurality of dot regions, to thereby divide the entire surface of the substrate into the plurality of regions and dispose the polarization layer for each divided region, with the result that the polarizer can be manufactured. Consequently, the array substrate having the polarization characteristics that are uniform in the surface can be stably obtained.

As described above, according to the embodiments, the polarizer including the polarization layer group corresponding to, not the entire surface of the substrate, but each dot region or the plurality of dot region, is used. Therefore, when the polarizer is manufactured, the polarizer does not have to be formed on the entire surface of the substrate correctively. Accordingly, for example, the entire surface of the substrate is divided into the plurality of regions, and the polarization layer group can be formed for each divided region. As a result, the polarizer having the polarization characteristics that are uniform in the surface can be obtained for the large-sized substrate, and the liquid crystal apparatus having excellent display characteristics.

These and other objects, features and advantages of the present invention will become more apparent in light of the following detailed description of best mode embodiments thereof, as illustrated in the accompanying drawings.

DESCRIPTION OF PREFERRED EMBODIMENTS

Figure 1:
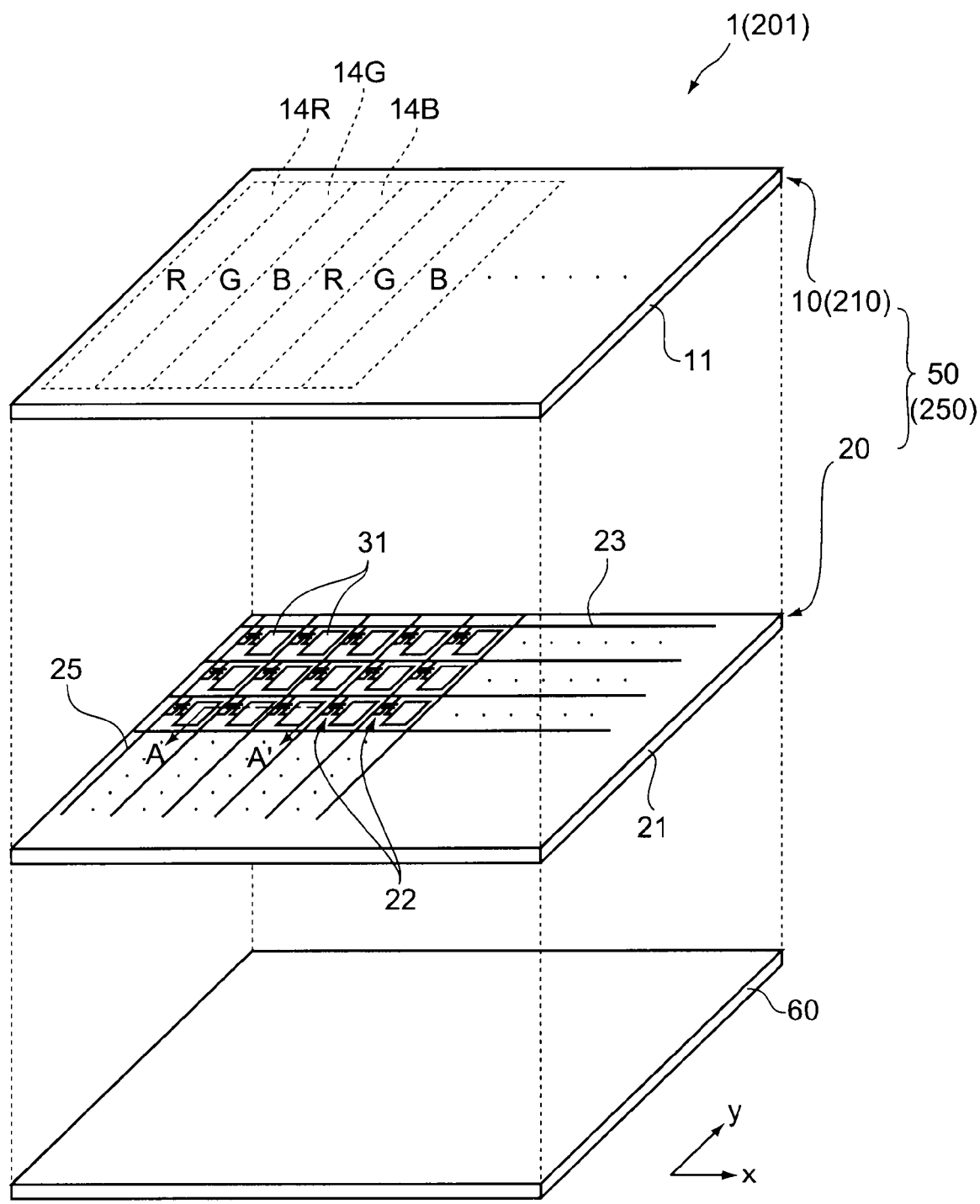
FIG. 1 is an exploded perspective view schematically showing a liquid crystal apparatus according to an embodiment.

Hereinafter, embodiments of the present invention will be described with reference to the drawings.

First Embodiment

As an example, a transmissive color TFT (Thin Film Transistor) liquid crystal apparatus according to an embodiment of the present invention will be described with reference to FIGS. 1 to 5. To facilitate visualization of the drawings, the number of components is set to be different from that of a structure of an actual liquid crystal apparatus, and degrees of scaling down are set to be different between the components in the drawings.

Figure 2:
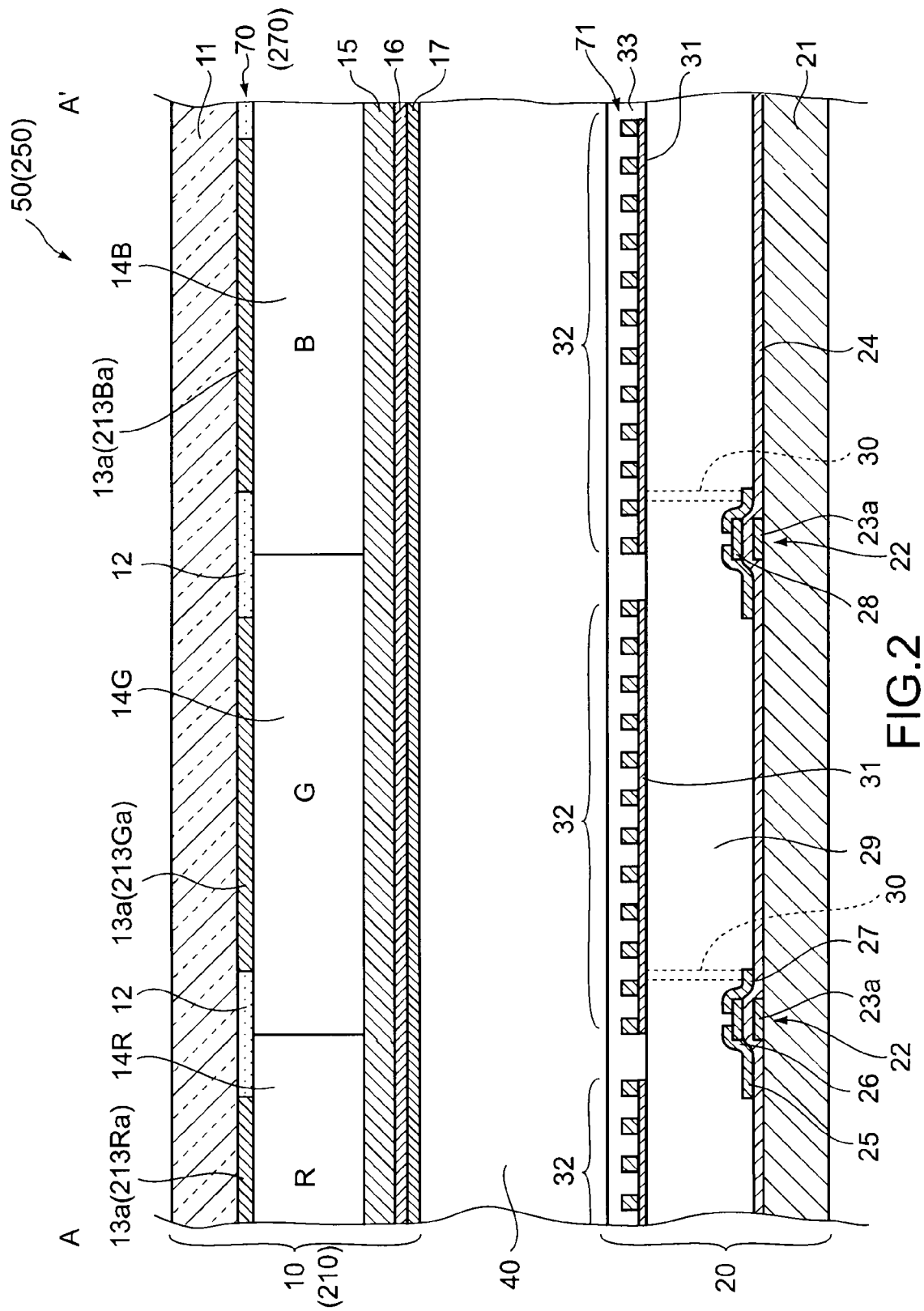
FIG. 2 is a cross-sectional view of a liquid crystal cell taken along the line A-A' of FIG. 1.
Figure 3:
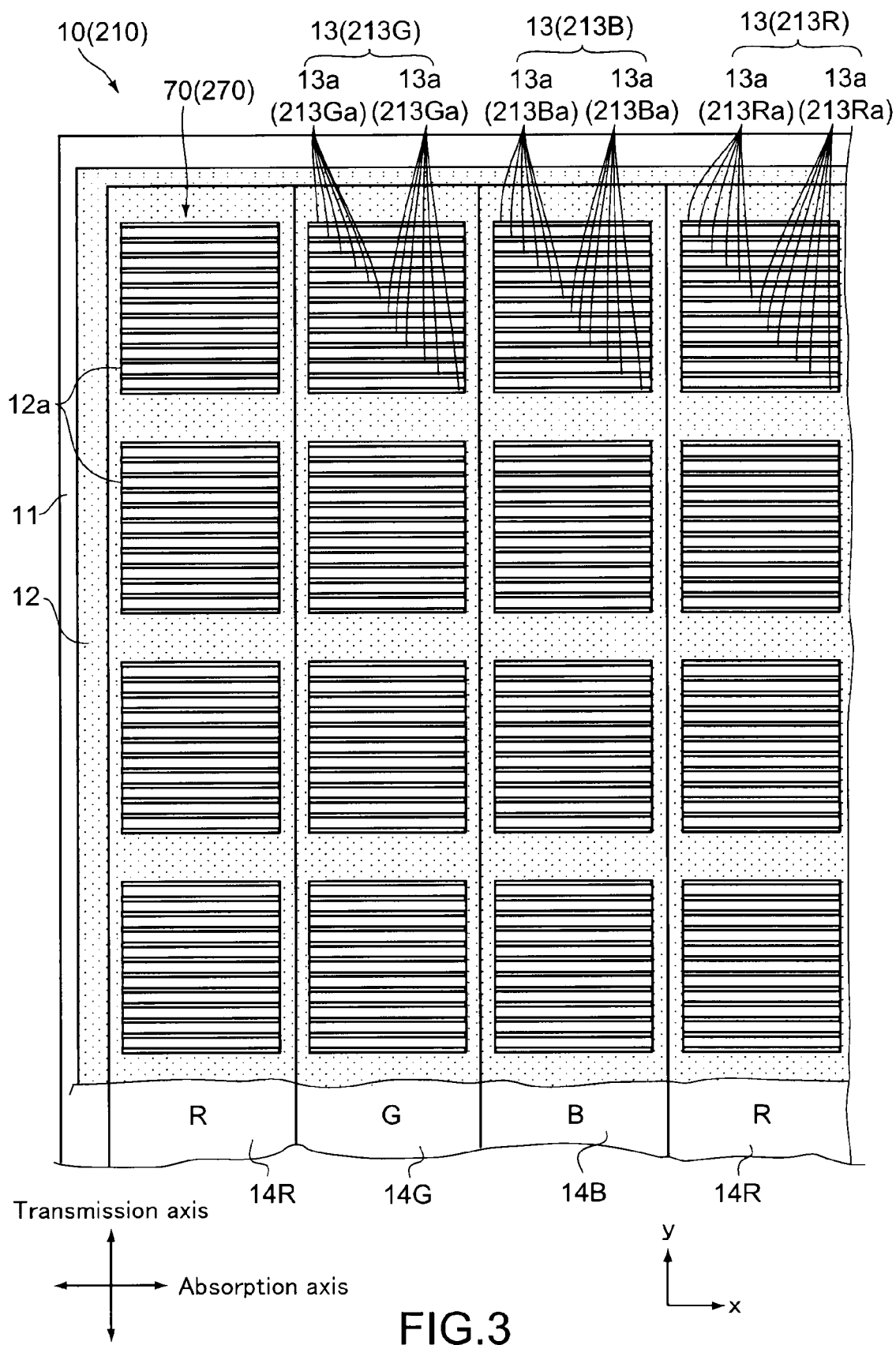
FIG. 3 is a partial schematic plan view showing a positional relationship among components formed on a color filter substrate of the liquid crystal apparatus shown in FIG. 1.
Figure 4:
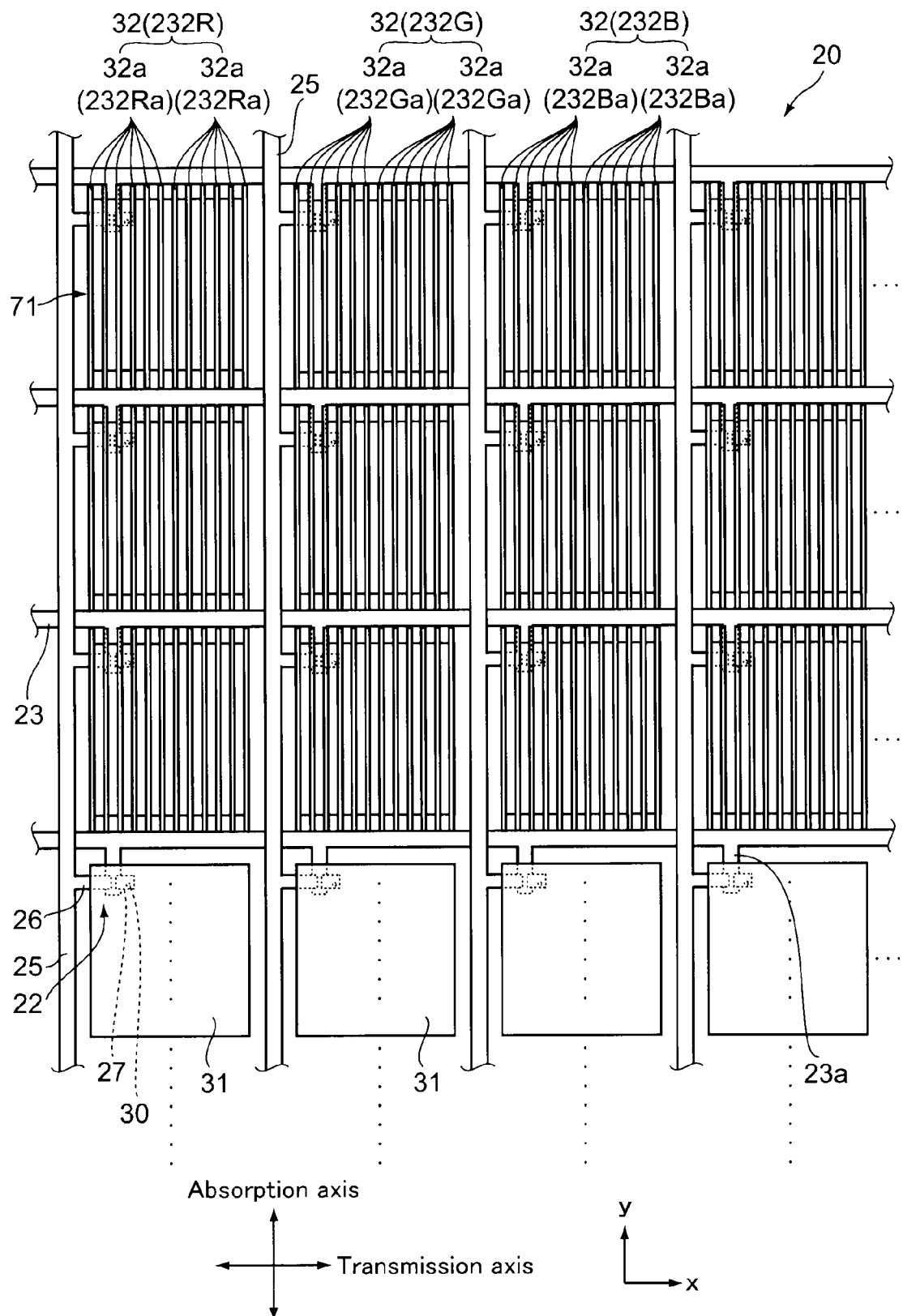
FIG. 4 is a partial schematic plan view showing a positional relationship among constituents formed on an array substrate of the liquid crystal apparatus shown in FIG. 1.
Figure 5:
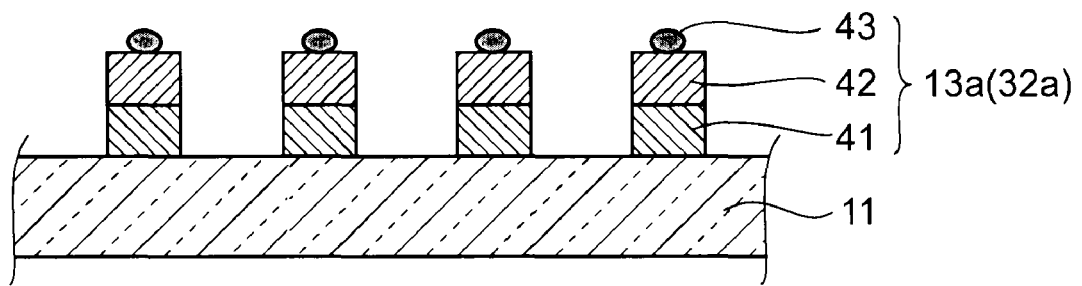
FIG. 5 is a schematic cross-sectional view of polarization layers disposed on each of the color filter substrate and the array substrate.
Figure 6:
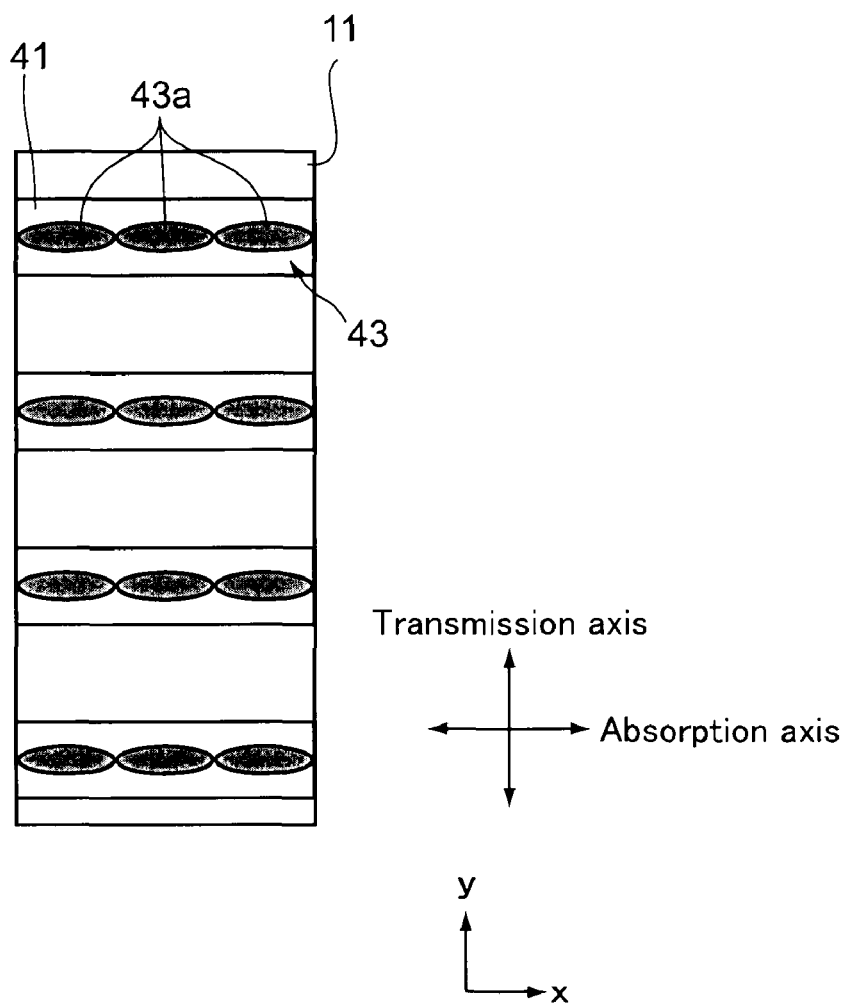
FIG. 6 is a schematic plan view showing the polarization layers shown in FIG. 5.

FIG. 1 is an exploded perspective view schematically showing a liquid crystal apparatus, in which equivalent circuits are provided on an array substrate. FIG. 2 is a cross-sectional view of a liquid crystal cell 50 taken along the line A-A' of FIG. 1. FIG. 3 is a partial schematic plan view showing a positional relationship among components formed on a color filter substrate 10 of the liquid crystal apparatus shown in FIG. 1. FIG. 4 is a partial schematic plan view showing a positional relationship among constituents formed on an array substrate 20 of the liquid crystal apparatus shown in FIG. 1. In FIG. 4, semiconductor layers that constitute a TFT are not shown to facilitate visualization of the drawing. FIG. 5 is a schematic cross-sectional view of polarization layers disposed on each of the color filter substrate and the array substrate. FIG. 6 is a schematic plan view showing the polarization layers shown in FIG. 5.

As shown in FIGS. 1 and 2, a color TFT liquid crystal apparatus 1 includes the liquid crystal cell 50 and a back light 60 for emitting light to the liquid crystal cell 50. The liquid crystal cell 50 includes a pair of the color filter substrate 10 and the array substrate 20 disposed with a predetermined gap, and a twisted nematic liquid crystal layer 40 sandwiched between the substrates. The back light 60 is disposed on the array substrate 20 side of the liquid crystal cell 50.

In the liquid crystal apparatus 1 in this embodiment, without using a polarizing plate disposed on an outside of a liquid crystal cell in the past, a polarizer having a function of the polarizing plate is disposed on each of surfaces of the array substrate and the color filter substrate that are opposed to each other, that is, disposed in the liquid crystal cell 50. In this embodiment, the polarizers disposed on the array substrate and the color filter substrate are disposed in a Cross-Nicol arrangement so that polarizing axes thereof are perpendicular to each other, and a normally white mode is adopted. Specifically, when the liquid crystal layer is in an on state, light emitted from the back light 60 is blocked by the two polarizers disposed on the respective substrates. Meanwhile, when the liquid crystal layer is in an off state, some polarization components of light emitted from the back light 60 are transmitted by the two polarizers disposed on the respective substrates.

As shown in FIGS. 1 to 3, the color filter substrate 10 includes a substrate 11 that is transparent with respect to visible light and is rectangular, a light shielding layer 12, a first polarizer 70, colored layers 14R, 14G, and 14B, an overcoat layer 15, an opposite electrode 16, and an alignment layer 17. The light shielding layer 12 sections and forms a plurality of dot regions 12a on a surface on the liquid crystal layer 40 side as one surface side of the transparent substrate 11. The first polarizer 70 is formed by arranging polarization layers so as to fill the regions sectioned by the light shielding layer 12. The colored layers 14R, 14G, and 14B of three colors of red (R), green (G), and blue (B) are formed in stripes so as to fill a gap between the light shielding layers 12 and correspond to the dot regions 12a. The overcoat layer 15 is disposed on the colored layers 14R, 14G, and 14B. The opposite electrode 16 is formed of a solid film disposed on the overcoat layer 15. The alignment layer 17 is disposed on the opposite electrode 16.

The transparent substrate 11 is made of a material transparent with respect to visible light, such as glass, sapphire, and crystal. In this embodiment, glass, in particular, quartz (refractive index: 1.46) or soda lime glass (refractive index: 1.51) is used. Element compositions of the glass material are not particularly limited. For example, low-cost glass materials such as silicate glass widely distributed as optical glass may be used. In addition, a flexible substrate such as a film may also be used.

The light shielding layer 12 controls transmission of light with respect to a region in which display control is difficult to be performed in the vicinity of the dot regions. For the light shielding layer 12, chrome, a chromic oxide, a metal layer obtained by layering chrome, the chromic oxide, or the like, a black resin, or the like can be used. In this embodiment, a lamination layer of chrome and the chromic oxide is used. The light shielding layer 12 includes a frame portion disposed along an outer periphery of the transparent substrate 11 and a grid portion formed in a grid pattern on a region surrounded by the frame portion. Each of the dot regions 12a sectioned and formed by the light shielding layer 12 functions as an effective display region that contributes to displaying when the liquid crystal apparatus 1 is driven in actuality. In this embodiment, the light shielding layer 12 is set to have a thickness of 0.2 μm. Further, the dot region 12a is set to have a width of 120 μm in an x-axis direction in the drawings and a width of 150 μm in a y-axis direction in the drawings. In addition, the grid portion of the light shielding layer 12 is set to have widths of 20 μm in the x-axis and y-axis directions in the drawings.

The colored layers 14R, 14G, and 14B are formed by dispersing pigments of red, green, and blue into an organic resin such as an acrylic resin. In this embodiment, the colored layers 14R, 14G, and 14B are arranged in stripes so as to correspond to the dot regions 12a, that is, so as to fill the gaps between the light shielding layers 12 and set a longitudinal direction thereof to be along the y-axis direction. The widths of the colored layers 14R, 14G, and 14B are designed so that both end portions of them overlap the light shielding portions 12. In the liquid crystal apparatus 1, three dots of R, G, and B disposed so as to correspond to three dot regions 12a adjacent in the x-axis direction constitute one pixel. It should be noted that the dot refers to a minimum unit constituting a display area of the liquid crystal apparatus 1. In this embodiment, because the case of the color display is described as an example, three dots constitute one pixel. In a case of a monochrome display, one dot constitutes one pixel. Thicknesses of the colored layers 14R, 14G, and 14B are set to 4 µm in this embodiment.

The overcoat layer 15 covers the colored layers 14R, 14G, and 14B, thereby eliminating unevenness of the surface of the colored layers, and prevents alignment failure in the liquid crystal layer 40 due to the unevenness of the color filter substrate when the liquid crystal apparatus 1 is manufactured. For the overcoat layer 15, an organic resin such as an acrylic resin can be used, and is set to have a thickness of 2 µm in this embodiment.

For the opposite electrode 16, a transparent electrode made of an ITO (Indium Tin Oxide) is used. The opposite electrode 16 is set to have a thickness of 0.1 µm, for example.

The alignment layer 17 aligns liquid crystal molecules in the liquid crystal layers 40 in a desired direction. The alignment layer 17 is formed by subjecting a polyimide film to a rubbing processing, and is set to have a thickness of 20 µm in this embodiment.

The first polarizer 70 is structured by arranging a first polarization layer group 13 formed for each of the dot regions 12a on the surface of the transparent substrate 11 on the liquid crystal layer 40 side. The number of the first polarization layer groups 13 is the same as the number of the dots. The first polarization layer groups 13 adjacent are set apart from each other, and the multiple polarization layer groups 13 are disposed on the transparent substrate 11 like island shapes. One first polarization layer group 13 is constituted of a plurality of (twelve in FIG. 3) first polarization layers 13a formed in one dot region 12a. The first polarization layers 13a each have a stripe shape extending in the x-axis direction and are disposed in parallel to each other. In this embodiment, the first polarization layer group 13 disposed on the color filter substrate 10 side is formed only in the dot region 12a in a plan view thereof, but it is desirable to form the first polarization layer group 13 so that the first polarization layer group 13 is larger than the dot region 12a that is rectangular in an x-y plane and an outline thereof surrounds the dot region 12a. With this structure, even when a displacement occurs when the first polarization layers 13a are formed, the first polarization layers 13a can be reliably disposed in the dot region 12a, with the result that a polarization failure due to nonexistence of the first polarization layers 13a in the dot region 12a can be prevented. Accordingly, light passing through the dot region 12a can be reliably polarized, and a liquid crystal apparatus having stable display characteristics can be obtained.

As shown in FIGS. 5 and 6, each of the first polarization layers 13a includes a stripe-shaped reflection layer 41 extending in a direction (x-axis direction in this embodiment) on one surface of the transparent substrate 11, a dielectric layer 42 formed on the reflection layer 41, and an inorganic fine particle layer 43 formed on the dielectric layer 42. The polarizer having the above-mentioned structure uses four operations of transmission, reflection, interference, and selective light absorption of a polarization wave by optical anisotropy, thereby attenuating a polarization wave (TE wave (S wave)) having electric-field components parallel in the longitudinal direction of the first polarization layer 13a and causing a polarization wave (TM wave (P wave)) having electric-field components perpendicular in the longitudinal direction of the first polarization layer 13a to pass therethrough.

That is, the TE wave is attenuated by the operations of the selective light absorption of the polarization wave by the optical anisotropy of the inorganic fine particle layer constituted of inorganic fine particles having shape anisotropy. The reflection layer functions as a wire grid and reflects the TE wave that has passed through the inorganic fine particle layer and the dielectric layer. By appropriately adjusting a refractive index and a thickness of the dielectric layer, the TE wave reflected by the reflection layer is partially absorbed when passing through the inorganic fine particle layer and partially reflected to return to the reflection layer. In addition, light that has passed through the inorganic fine particle layer is attenuated through interference. In this way, by subjecting the TE wave to the selective attenuation, desired polarization characteristics can be obtained.

The reflection layer 41 can be formed of a material of a typical wire-grid polarization element. In this embodiment, aluminum is used therefor. In addition, a semiconductor material or metal such as silver, gold, copper, molybdenum, chrome, titanium, nickel, tungsten, iron, silicon, germanium, and tellurium can be used therefor. In addition to the metal material, the reflection layer 41 may be formed of a resin film or an inorganic film other than metal whose reflectance on a surface thereof is set to be high by coloring or the like.

The reflection layers 41 are arranged on the surface of the transparent substrate 11 at smaller pitches than a wavelength of a visible light range and formed by a photolithography and an etching technique, for example. Each of the reflection layers 41 has a function as a wire-grid polarizer, attenuates the polarization wave (TE wave (S wave)) having electric-field components in a direction parallel to a direction in which the first polarization layer 13a extends (longitudinal direction, x-axis direction in FIGS. 3 and 6), out of light that has entered the surface of the transparent substrate 11, and causes the polarization wave (TM wave (P wave)) having electric-field components in a direction perpendicular to a direction in which the first polarization layer 13a extends (y-axis direction in FIGS. 3 and 6) to pass therethrough.

It should be noted that a pitch, a line width/pitch, a grid depth, and a grid length of the reflection layer 41 of the plurality of stripe-shaped first polarization layers 13a that constitute one first polarization layer group 13 are desirably set as follows.

$$0.05\ \mu m < pitch < 0.8\ \mu m$$

$$0.1 < (line\ width/pitch) < 0.9$$

$$0.01\ \mu m < grid\ depth < 1\ \mu m$$

$$0.05\ \mu m < grid\ length$$

In this embodiment, the pitch is set to about 150 nm, the line width is set to 55 nm, the grid depth is set to 160 nm, and the grid length is set to 150 µm. In this embodiment, to facilitate visualization of the drawings, the number of the first polarization layers 13a constituting one first polarization layer group 13 is set to be different from that of an actual one.

Further, in order to reduce reflection on a surface of the substrate in a region where the reflection layer 41 is not formed, a non-reflection coat may be applied in advance on the surface of the transparent substrate 11, and thereafter the first polarization layers 13a may be formed. The non-reflection coat can be formed of a typical lamination film including films having a high refractive index and a low refractive index. By applying a similar non-reflection coat to a back surface of the transparent substrate 11, the reflection on the surface of the transparent substrate can be reduced.

The dielectric layer 42 is formed of an optical material such as $SiO_2$ that is transparent with respect to visible light and formed on the transparent substrate 11 by a sputtering method or a sol-gel method (method of coating the surface with a sol by a spin coating method and turning it into a gel by thermal curing, for example). The dielectric layer 42 is formed in order to structure a base layer of the inorganic fine particle layer 43 and adjust a phase of polarized light that has passed through the inorganic fine particle layer 43 and has been reflected by the reflection layer 41 to enhance an interference effect with respect to the polarized light reflected by the inorganic fine particle layer 43 as described later, and the thickness of the dielectric layer 42 is desirably set so that a phase is shifted by a half wavelength. But, reflected light can be absorbed because the inorganic fine particle layer has an absorption effect, and even when the thickness is not optimized, a contrast can be improved. Therefore, in practice, the thickness may be determined in consideration of both the desired polarization characteristics and actual manufacturing processes. In practice, a range of the thickness falls within 1 to 500 nm, more desirably, 300 nm or less.

The dielectric layer 42 can be made of a typical material such as $SiO_2$, $Al_2O_3$, and $MgF_2$. Those materials each can be formed into a thin film by a typical vacuum deposition method such as the sputtering, a vapor-phase growth method, and a vapor deposition method, or by coating the substrate with a sol-like matter and subjecting the matter to thermal curing. Further, the refractive index of the dielectric layer 42 is desirably set to be larger than 1 and equal to or smaller than 2.5. In addition, optical characteristics of the inorganic fine particle layer 43 are affected by refractive indexes of surroundings, and therefore the polarization characteristics may be controlled by the material of the dielectric layer. In this embodiment, the dielectric layer 42 is made of $SiO_2$ having a thickness of 30 nm.

As shown in FIG. 6, in the inorganic fine particle layer 43, extended-elliptical island-like inorganic fine particles 43a each having a long axis in parallel to a longitudinal direction (x-axis direction in FIG. 6) of the reflection layer 41 and having a short axis in the y-axis direction perpendicular to the longitudinal direction of the reflection layer 41 are linearly arranged in the x-axis direction in an x-y plane of the transparent substrate 11. In addition, the inorganic fine particle layer 43 is provided on the dielectric layer 42 above the reflection layer 41. Accordingly, the inorganic fine particle layer 43 has a wire grid structure of the same pattern as that of the reflection layer on the transparent substrate 11. However, the inorganic fine particle layer does not have a structure of a typical thin film continuously formed in the x-y plane unlike the reflection layer, but is constituted of island-like fine particles having a grain boundary. Each size of the fine particles is desirably set to be equal to or smaller than a wavelength of light as a target.

When the inorganic fine particles 43a that constitute the inorganic fine particle layer 43 are each formed to have a shape anisotropy between the x-axis direction and the y-axis direction in FIGS. 3 and 6, an optical constant in the long axis direction can be made different from that in the short axis direction. As a result, predetermined polarization characteristics of absorbing polarization components parallel to the long axis and causing polarization components parallel to the short axis to pass can be obtained. It should be noted that a case where the inorganic fine particles 43a do not have the shape anisotropy (for example, circular shape) is not desirable because the TM wave may be absorbed in an absorption band of the TE wave.

To control the shape anisotropy of the inorganic fine particle layer 43, it is effective to narrow the arrangement pitch of the reflection layers 41 and deposit the inorganic fine particles 43a only on a top or a side wall of the dielectric layer 42. With this structure, the inorganic fine particles 43a can be isolated. In addition, as a film formation method of the inorganic fine particles 43a, an oblique sputtering such as an ion-beam sputtering method of forming a film on the surface of the substrate 11 in an oblique direction is effective. Each of the inorganic fine particles 43a is desirably formed in a complete island-like shape but may be defined by a grain boundary.

An absorption wavelength by the optical anisotropy of the inorganic fine particles 43a depends on characteristics of the material, the shape anisotropy of the fine particle, a permittivity of surroundings, and the like. In this embodiment, the inorganic fine particle layer 43 is formed so as to obtain the polarization characteristics with respect to the visible light range. Herein, it may be necessary to select an appropriate material as the material constituting the inorganic fine particles 43a in accordance with a usage band by the first polarization layer 13a, for example, a metal material or a semiconductor material. Specifically, examples of the metal material include substances of Al, Ag, Cu, Au, Mo, Cr, Ti, W, Ni, Fe, Si, Ge, Te, and Sn and alloys containing those. Examples of the semiconductor material include Si, Ge, and Te. In addition, a silicide material such as $FeSi_2$ (in particular, $\beta$-$FeSi_2$), $MgSi_2$, $NiSi_2$, $BaSi_2$, $CrSi_2$, and $CoSi_2$ is suitable therefor. In this embodiment, Ge (germanium) is used as a material of the inorganic fine particles 43a. As a result, a high contrast (high extinction ratio) can be obtained with visible light. In this embodiment, germanium fine particle layers are layered by 10 nm to form the inorganic fine particle layers 43.

In a case where the first polarizer 70 having the above-described structure according to this embodiment is incorporated in the liquid crystal apparatus 1, the inorganic fine particle layer 43 side corresponds to a light incident side on which light from the back light 60 enters, and the reflection layer 41 side corresponds to a light exit side. The first polarizer 70 uses four operations of transmission, reflection, interference, and selective light absorption of the polarization wave by the optical anisotropy, thereby attenuating the polarization wave (TE wave (S wave)) having electric-field components parallel to the longitudinal direction (y-axis direction in FIGS. 3 and 6) of the first polarization layer 13a in a stripe shape, and causing a polarization wave (TM wave (P wave)) having electric-field components perpendicular to the longitudinal direction (x-axis direction in FIGS. 3 and 6) of the first polarization layer 13a to pass therethrough. The TE wave caused to enter the first polarizer 70 from the inorganic fine particle layer 43 side is attenuated by the operations of the selective light absorption of the polarization wave by the optical anisotropy of the inorganic fine particle layer 43 having shape anisotropy. The reflection layer 41 functions as a wire grid and reflects the TE wave that has caused to enter the first polarizer 70 from the inorganic fine particle layer 43 side and has passed through the inorganic fine particle layer 43 and the dielectric layer 42. At this time, by structuring the dielectric layer 42 so that the phase of the TE wave that has passed through the inorganic fine particle layer 43 and has been reflected by the reflection layer 41 is shifted by a half wavelength, the TE wave reflected by the reflection layer 41 is interfered with the TE wave reflected by the inorganic particle layer 43, canceled therewith, and thus attenuated. As described above, the selective attenuation can be performed on the TE wave. The thickness for realizing the half wavelength shift as described above is desirable. However, even when the thickness of the dielectric layer 42 is not optimized, the contrast can be improved because the inorganic fine particle layer 43 has an absorption effect. In practice, the thickness may be determined in consideration of the desired polarization characteristics and the actual manufacturing processes.

In addition, an uppermost surface of the first polarizer 70, that is, the inorganic fine particle layer 43 may be coated with a transparent protection film that is made of $SiO_2$ or the like and formed to have a thickness so as not to affect the polarization characteristics, which is effective for improving insulation with the surroundings. However, because the optical characteristics of the inorganic fine particle may be affected by refractive indexes of the surroundings, the polarization characteristics may change due to the formation of the protection film in some cases. In addition, the reflectance with respect to the incident light varies depending on an optical thickness (obtained by multiplying the refractive index by the thickness of the protection film) of the protection film, and therefore the material of the protection film and the thickness thereof may be required to be selected in view of the above. A material whose refractive index is 2 or less and whose extinction coefficient is close to 0 is desirable. As the material, $SiO_2$, $Al_2O_2$, and the like are used. Those materials can be formed by the typical vapor deposition method (e.g., vapor-phase growth method, sputtering method, and vapor deposition method) or by applying the spin coating method, a dip method, or the like to a sol obtained by dispersing those materials in a liquid.

As shown in FIGS. 1, 2, and 4, the array substrate 20 includes a transparent substrate 21, scanning lines 23, signal lines 25, TFTs 22, an interlayer insulator 29, pixel electrodes 31, a second polarizer 71, and an alignment layer 33. The transparent substrate 21 is rectangular and transparent with respect to visible light. The scanning lines 23 and the signal lines 25 are disposed on one surface of the transparent substrate 21 on the liquid crystal layer 40 side so as to intersect with each other. The TFTs 22 function as a plurality of switching elements provided for each crossing portion of the scanning lines 23 and the signal lines 25. The interlayer insulator 29 is provided on an approximately entire surface of the substrate so as to cover the TFTs 22. The pixel electrodes 31 are provided so as to correspond to the dot regions 12a and are electrically connected with the TFTs 22 via contact holes 30 formed in the interlayer insulator 29. The second polarizer 71 is constituted of a plurality of second polarization layer group 32 formed on the pixel electrodes for each pixel electrode 31. The alignment layer 33 is disposed on the pixel electrodes 31 and the second polarization layer group 32 so as to cover the pixel electrodes 31 and the second polarization layer group 32. The TFTs 22 each include a gate electrode 23a, a gate insulation film 24, a semiconductor layer 28, a source electrode 26, and a drain electrode 27. The gate electrode 23a is formed on the same layer as the scanning line 23 and electrically connected with the scanning line 23. The gate insulation film 24 is provided on the entire surface of the transparent substrate 21 so as to cover the gate electrode 23a. The semiconductor layer 28 overlaps with the gate electrode 23a in the plan view with the gate insulation film 24 intervening therebetween. The source electrode 26 is electrically connected with the semiconductor layer 28 and formed on the same layer as the signal line 25 so as to be electrically connected therewith. The drain electrode 27 is electrically connected with the semiconductor layer 28 and formed on the same layer as the source electrode 26. The drain electrode 27 is electrically connected with the pixel electrode 31 via the contact hole 30.

For the transparent substrate 21, the same material as the transparent substrate 11 described above can be used.

The scanning lines 23 and the gate electrodes 23a can be formed by using high-melting-point metal such as Mo, Ta, TaN, and Ti. Herein, MoTa having a thickness of 90 nm is used. The signal lines 25, the source electrodes 26, and the drain electrodes 27 can be formed of, for example, Mo or Al, or a lamination layer of them. Herein, a lamination film including three layers of Mo/Al/Mo having a thickness of 100 nm is used. The interlayer insulator 29 is made of an organic resin such as an acrylic resin having a thickness of 1 to 2 μm. By providing the interlayer insulator 29, unevenness due to the TFTs 22 can be eliminated to flatten the surface. As a result, in FIG. 4, the pixel electrode 31 can be provided so that the pixel electrode 31 and the scanning lines 23 and signal lines 25 are overlapped in the plan view, which can improve an aperture ratio of a display effective area. Herein, for the gate insulation film 24, a lamination film including two layers of a SiN film having a thickness of 200 nm and a $SiO_2$ film having a thickness of 150 nm is used. For the semiconductor layer 28, amorphous silicon or polysilicon can be used. Herein, amorphous silicon having a thickness of 45 nm is used. For the pixel electrode 31, a transparent electrode made of an ITO (Indium Tin Oxide) is used, and a thickness thereof is set to 0.1 μm, for example. Further, the scanning lines 23, the signal lines 25, and the TFTs 22 are overlapped with the light shielding layer 12 in the plan view of the liquid crystal apparatus 1.

Each of the rectangular pixel electrodes 31 has a width of 124 μm in the x-axis direction and a width of 154 μm in the y-axis direction. The pixel electrodes adjacent to each other are set apart by 16 μm. In addition, the widths of the scanning lines 23 and the signal lines 25 are respectively set to 10 μm. The pixel electrodes 31 correspond to the dot regions in a one-to-one relationship. When the liquid crystal apparatus 1 is manufactured, in the plan view thereof, the pixel electrode 31 is slightly larger than the dot region 12a, and the pixel electrode 31 and the dot region 12a are overlapped so that an outline of the pixel electrode 31 surrounds the dot region 12a.

The alignment layer 33 aligns the liquid crystal molecules in the liquid crystal layer 40 in a desired direction. The alignment layer 33 is formed by subjecting a polyimide film to a rubbing processing and is set to have a thickness of 20 μm in this embodiment.

The second polarizer 71 is structured by arranging a second polarization layer group 32 formed for each of the pixel electrodes 31, that is, for each of the dot regions 12a on the surface of the transparent substrate 21 on the liquid crystal layer 40 side. The number of the second polarization layer groups 32 is the same as the number of the dots. The second polarization layer groups 32 adjacent are set apart from each other, and the multiple second polarization layer groups 32 are disposed on the transparent substrate 21 like island shapes. One second polarization layer group 32 is constituted of a plurality of (twelve in FIG. 4) second polarization layers 32a formed in one pixel electrode 31. The second polarization layers 32a have stripe shapes extending in the y-axis direction in parallel to each other. The outline of the second polarization layer group 32 is set to be slightly larger than the pixel electrode 31 and surrounds the pixel electrode 31. With this structure, even when a displacement occurs when the second polarization layer group 32 is formed, the second polarization layer groups 32 can be reliably disposed on the pixel electrode 31. As a result, a polarization failure due to nonexistence of the second polarization layer 32a in the dot region 12a can be prevented. Accordingly, light passing through the dot region 12a can be reliably polarized, and a liquid crystal apparatus having stable display characteristics can be obtained.

As shown in FIG. 5, the second polarization layer 32a includes the reflection layer 41, the dielectric layer 42 formed on the reflection layer 41, and the inorganic fine particle layer 43 formed on the dielectric layer 42. When the liquid crystal apparatus 1 is manufactured, the second polarizer 71 is formed so that the inorganic fine particle layer 43 is positioned on an incident side of light from the back light 60 and the reflection layer 41 is positioned on a light exit side.

The materials, the thicknesses, and the like of reflection layer 41, the dielectric layer 42, and the inorganic fine particle layer 43 are the same as those of the above-described first polarizer 70 disposed on the color filter substrate 10 side.

The desirable pitch, line width/pitch, grid depth, and grid length of the reflection layer 41 are the same as those of the first polarizer 70 disposed on the color filter substrate 10 side. In this embodiment, with respect to the reflection layer 41 of the second polarization layers 32a constituting the second polarization layer group 32, the pitch is set to about 160 nm, the line width is set to 55 nm, the grid depth is set to 160 nm, and the grid length is set to 120 μm. In this embodiment, to facilitate visualization of the drawings, the number of the second polarization layers 32a constituting one second polarization layer group 32 is set to be different from that of an actual one. The reflection layer 41 of the second polarization layer 32a also functions as a wire grid polarizer like the first polarization layer 13a, attenuates the polarization wave (TE wave (S wave)) having electric-field components in a direction parallel to a direction in which the second polarization layer 32a extends (y-axis direction in FIG. 4), out of light that has entered the surface of the transparent substrate 11, and causes the polarization wave (TM wave (P wave)) having electric-field components in a direction perpendicular to a direction in which the second polarization layer 32a extends (x-axis direction in FIG. 4) to pass therethrough.

In this embodiment, transmission axes of the first polarization layer 13 and the second polarization layer 32 are perpendicular to each other.

Next, a manufacturing method of the liquid crystal apparatus 1 will be described with reference to FIGS. 8 and 9.

FIGS. 8A to 8H are manufacturing process diagrams of the color filter substrate. FIGS. 9A to 9G are manufacturing process diagrams of the array substrate.

Figure 8A:
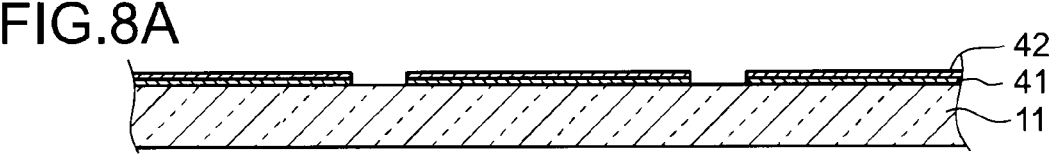
FIGS. 8A to 8H are manufacturing process diagrams of the color filter substrate.

First, a manufacturing method of the color filter will be described. As shown in FIG. 8A, an aluminum film and a SiO$_2$ film are successively formed on the transparent substrate 11 by the sputtering. The obtained lamination film is subjected to the patterning by using the photolithography and the etching technique, and thus the reflection layer 41 made of aluminum and the dielectric layer 42 made of SiO$_2$ are formed. It should be noted that in a case where the transparent substrate 11 has a large size, the surface of the substrate is divided into a plurality of regions, and an exposure process in a mask formation by the photolithography can be performed for each divided region. Thus, even on the transparent substrate that is difficult to be subjected to one-shot exposure, the reflection layer 41 and the dielectric layer 42 each can be formed in a pattern dimension and thickness uniform in a plane. The reason why the divisional exposure can be performed is that the polarization layer groups constituting the polarizer are independently provided for each dot region and it is unnecessary to take into consideration an overlap and the like of the formed layers in a boundary portion between the divided regions adjacent due to a displacement at the time of exposure.

Figure 8B:
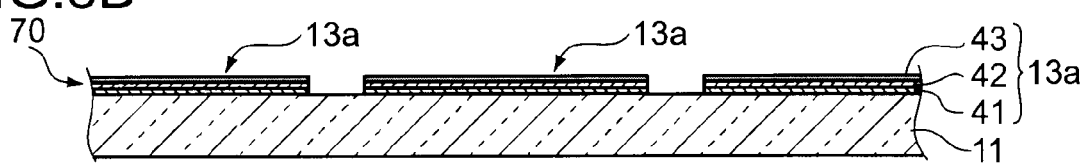
Figure 10:
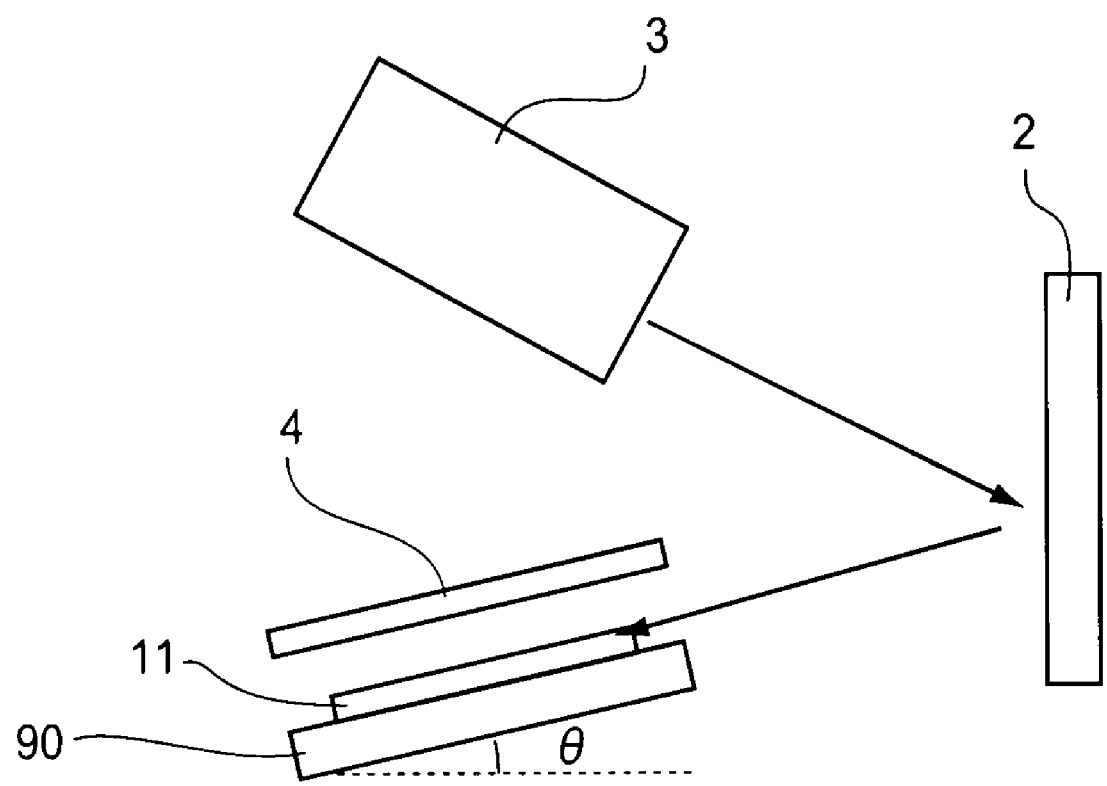
FIG. 10 is a diagram illustrating a film formation by an oblique sputtering for forming an inorganic fine particle layer.

As shown in FIG. 8B, Ge particles are sputtered on the surface of the transparent substrate 11 by the ion-beam sputtering by which a film is formed in an oblique direction, and thus the inorganic fine particle layer 43 is formed. As a result, the first polarizer 70 constituted of the reflection layer 41, the dielectric layer 42, and the inorganic fine particle layer 43 is formed. FIG. 10 is a diagram illustrating a film formation by the oblique sputtering for forming the inorganic fine particle layer 43. Herein, the example of the ion-beam sputtering is shown. However, the method is not limited to this and may be any method as long as the sputtering is used.

In FIG. 10, a reference numeral 90 denotes a stage for supporting the transparent substrate 11, a reference numeral 2 denotes a target, a reference numeral 3 denotes a beam source (ion source), and a reference numeral 4 denotes a control plate. The stage 90 is inclined with respect to a normal direction to the target 2 by a predetermined angle θ. The transparent substrate 11 is disposed in a direction in which the longitudinal direction of the reflection layer 41 and the dielectric layer 42 is perpendicular to the incident direction of the inorganic particles from the target 2. The angle θ falls within the range of 0° to 20°, for example. Ions emitted from the beam source 3 are directed to the target 2. The inorganic fine particles sputtered from the target 2 by the irradiation with the ion beams enter the surface of the transparent substrate 11 in the oblique direction and adhere onto the dielectric layer 42. In addition, the inorganic fine particle layer 43 has an optical anisotropy between the arrangement direction of the inorganic fine particles 43a and a direction perpendicular to the arrangement direction of the inorganic fine particles 43a.

Figure 8C:
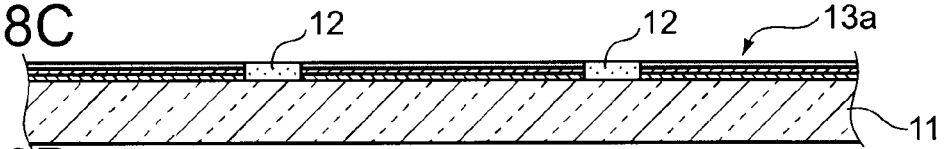

Next, as shown in FIG. 8C, the light shielding layer 12 having a lamination structure of chrome and a chromic oxide is formed. The light shielding layer 12 can be formed by forming a chrome film and a chromic oxide film by the sputtering and patterning the lamination film into a desired shape by using the photolithography and the etching technique. At the time when the above-described first polarizer 70 is formed, by forming the first polarization layer group 13 so that the outline thereof is set to be larger than that of each of the dot regions 12a sectioned and formed by the light shielding layer 12, that is, so that an outer periphery thereof overlaps with the light shielding layer 12, the first polarization layer 13a can be reliably formed in each of the dot regions 12a sectioned and formed by the light shielding layer 12 even when a displacement occurs in the process of forming the polarizer and the light shielding layer, for example.

Figure 8D:
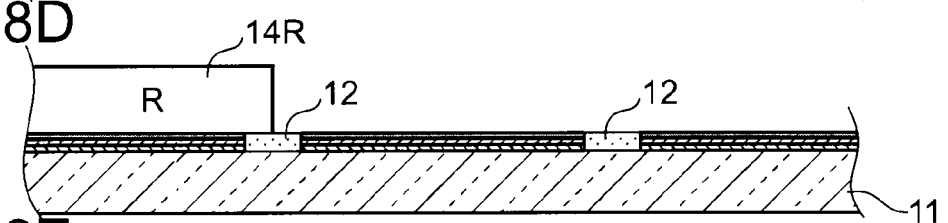
Figure 8E:
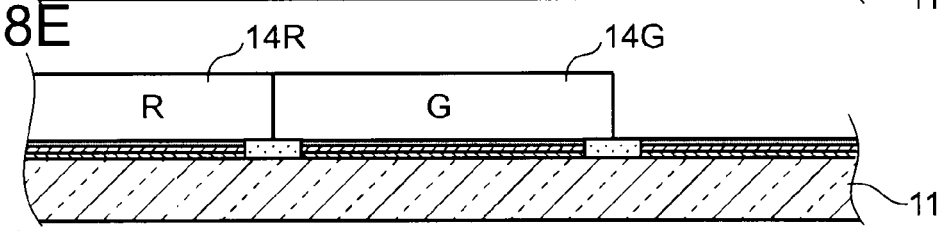
Figure 8F:
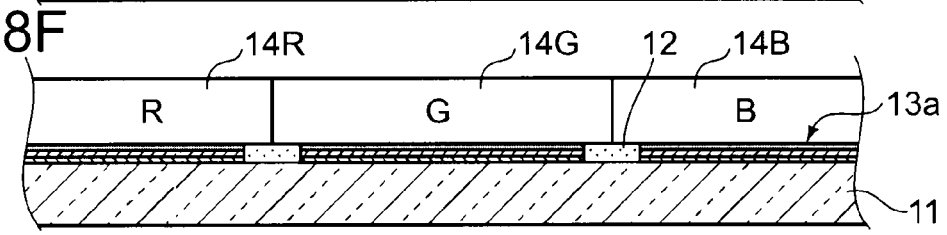

Next, as shown in FIGS. 8D, 8E, and 8F, colored resin films in which pigments are dispersed are formed and patterned by the photolithography and the etching technique, and the red colored layer 14R, the green colored layer 14G, and the blue colored layer 14B are successively formed. It should be noted that the colored layers can also be formed by the ink-jet method.

Figure 8G:
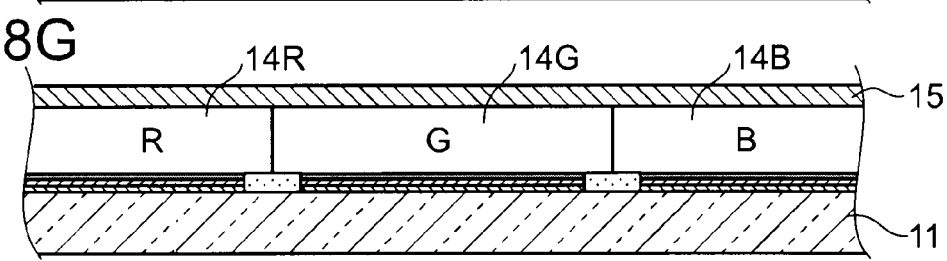

Next, as shown in FIG. 8G, the overcoat layer 15 is formed on the colored layers 14R, 14G, and 14B.

Figure 8H:
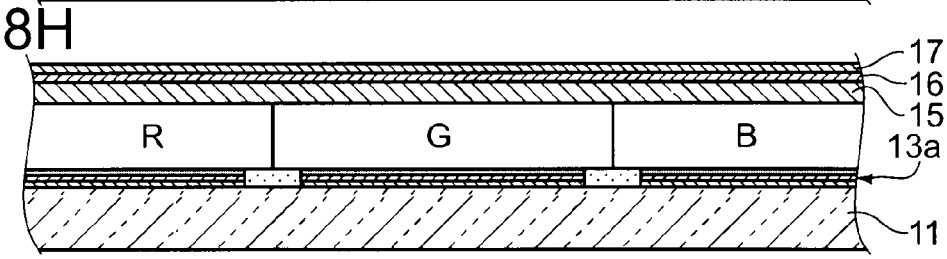

Next, as shown in FIG. 8H, the solid opposite electrode 16 made of the ITO is formed by the sputtering or the like, a polyimide film is formed on the opposite electrode 16, and then the formed film is subjected to the rubbing processing, to thereby form the alignment layer 17.

By the processings described above, the color filter substrate is formed.

Next, a manufacturing method of the array substrate will be described.

Figure 9A:
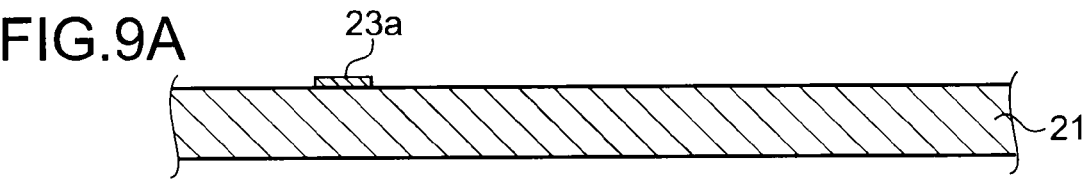
FIGS. 9A to 9G are manufacturing process diagrams of the array substrate.

As shown in FIG. 9A, on one surface of the transparent substrate 21 on the liquid crystal layer 40 side, an MoTa film is formed by the sputtering and then patterned by the photolithography and the etching technique, to thereby form the scanning line 23 and the gate electrode 23a.

Figure 9B:
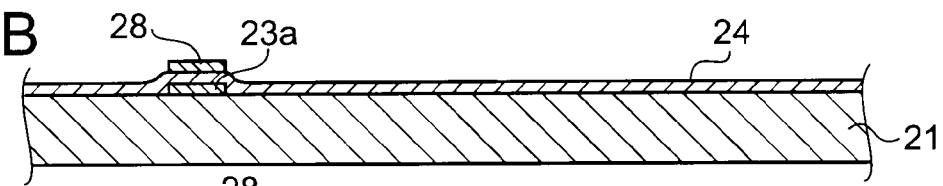

Next, as shown in FIG. 9B, on the transparent substrate 21 including the scanning line 23 and the gate electrode 23a, a SiN film, a SiO$_2$ film, and an amorphous silicon film are successively formed by a plasma CVD. After that, the amorphous silicon film is patterned into a desired shape by the photolithography and the etching technique. As a result, the gate insulation film 24 formed of the lamination film constituted of two layers of the SiN film and the SiO$_2$ film and the semiconductor layer 28 made of amorphous silicon are formed.

Figure 9C:
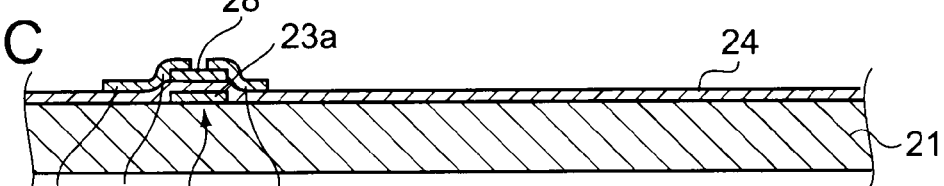

Next, as shown in FIG. 9C, a lamination film constituted of three layers of Mo/Al/Mo is formed by the sputtering, and the lamination film is patterned by the photolithography and the etching technique, to form the signal line 25, the source electrode 26, and the drain electrode 27.

Figure 9D:
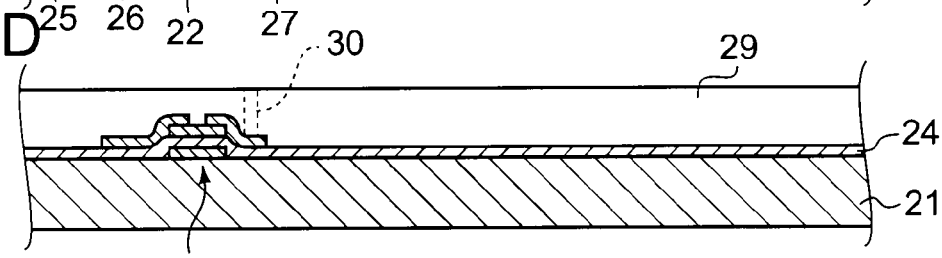

Next, as shown in FIG. 9D, the interlayer insulator 29 made of an organic resin is formed, and the contact hole 30 for electrically connecting the drain electrode 27 with the pixel electrode formed in the post-processing is formed in the interlayer insulator 29 by the photolithography and the etching technique.

Figure 9E:
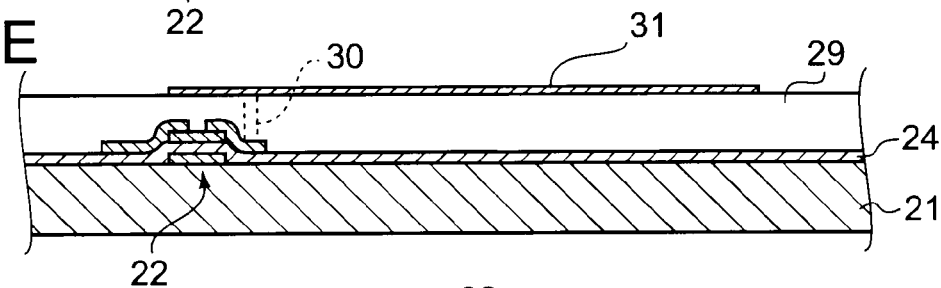

Next, as shown in FIG. 9E, an ITO film is sputtered on the interlayer insulator 29, and the film is patterned by the photolithography and the etching technique, to form the pixel electrode 31. When the ITO film is formed, the ITO film is also formed in the contact hole, and therefore the pixel electrode 31 and the drain electrode 27 are electrically connected with each other by the ITO film formed in the contact hole 30.

Figure 9F:
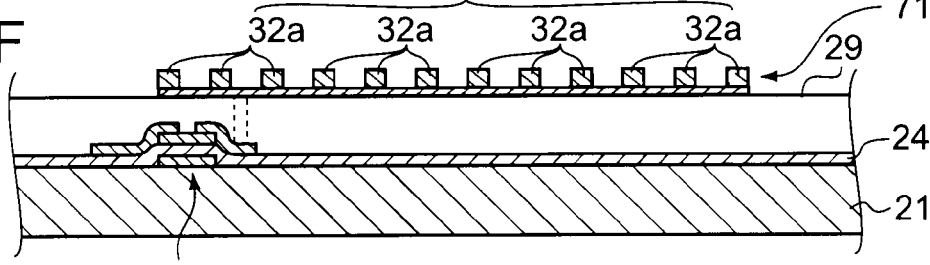

Next, as shown in FIG. 9F, the second polarization layer group 32 constituted of the plurality of second polarization layer 32a is formed on the pixel electrode 31 so as to correspond to one pixel electrode 31, to thereby form the second polarizer 71. In the method of forming the second polarization layers 32a, as in the case where the inorganic fine particle layer 43 of the above-described first polarizer 70 is formed, on the entire substrate including the pixel electrode 31, an inorganic fine particle film is formed by the oblique ion-beam sputtering. After that, the aluminum film and the SiO$_2$ film are successively formed on the inorganic fine particle film by the sputtering. Next, the obtained lamination film is patterned by the photolithography and the etching technique, to thereby form the second polarizer 71 constituted of the inorganic layer 43, the dielectric layer 42, and the reflection layer 41. Herein, in a case where the transparent substrate 21 has a large size, the surface of the substrate is divided into a plurality of regions, and an exposure process in a mask formation by the photolithography can be performed for each divided region. Thus, even on the transparent substrate that is difficult to be subjected to one-shot exposure, the inorganic fine particle layer 43, the dielectric layer 42, and the reflection layer 41 each can be formed in a pattern dimension and thickness uniform in a plane. The reason why the divisional exposure can be performed is that the polarization layer groups constituting the polarizer are independently provided for each dot region and it is unnecessary to take into consideration an overlap and the like of the formed layers in a boundary portion between the divided regions adjacent due to a displacement at the time of exposure.

Figure 9G:
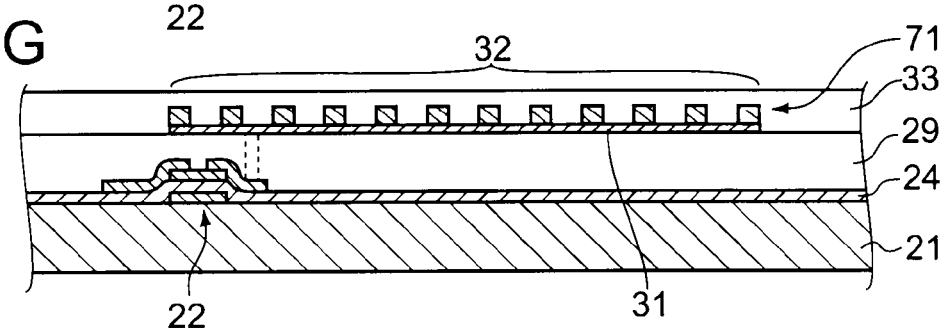

Next, as shown in FIG. 9G, the polyimide film is formed on the entire surface of the substrate including the second polarizer 71 and is subjected to the rubbing processing, to thereby form the alignment layer 33.

By the processings described above, the array substrate is manufactured.

The color filter substrate and the array substrate manufactured by the manufacturing methods described above are bonded with a predetermined gap by a seal material having a liquid crystal inlet and formed along the outer periphery of the substrates. After that, the liquid crystal is injected between the two substrates from the liquid crystal inlet, and the liquid crystal inlet is sealed by a sealant, to form the liquid crystal cell 50.

After that, a drive circuit substrate (not shown) and the like are electrically connected to the liquid crystal cell 50, and the back light is provided to the liquid crystal cell 50 on the array substrate 20 side, to form the liquid crystal apparatus 1.

As described above, in this embodiment, the polarization layers are independently provided for each dot region. Accordingly, even in the liquid crystal apparatus having a large screen such as a large-sized liquid crystal television, it is possible to divide the screen to form the polarization layer for each divided region, with the result that the liquid crystal apparatus having the uniform polarization characteristics on the display surface can be stably obtained. In other words, in a case where the entire surface of the screen is coated with polarization elements, when the substrate has a large size, it is difficult to perform the film formation uniformly in the plane, and therefore the polarizer having the uniform polarization characteristics in the plane is hardly obtained. In contrast, as in this embodiment, by independently providing the polarization layers for each dot region, the entire surface of the substrate can be divided into the plurality of regions to form the polarization layers for each divided region. As a result, the liquid crystal apparatus having the uniform polarization characteristics on the display surface can be obtained.

Further, in the present invention, on the same surface side as the substrate surface on which the components such as the colored layer and the TFT are disposed, the polarizer can be formed into the liquid crystal cell in the manufacturing process of those components. Therefore, the process of bonding a pair of polarizing plates on the outside of the liquid crystal cell in related art can be eliminated, which improves a manufacturing efficiency.

Figure 7:
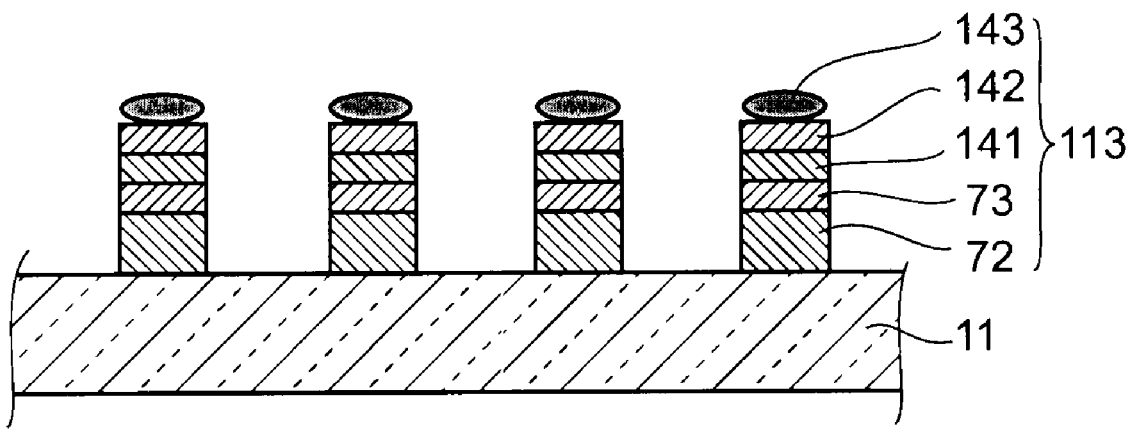
FIG. 7 is a cross-sectional view of polarization layers in another example.

In this embodiment, the polarizer has the lamination structure of the reflection layer, the dielectric layer, and the inorganic fine particle layers. In addition, by imparting the shape anisotropy between the long-axis direction and the short-axis direction of the inorganic fine particles constituting the inorganic fine particle layer, and by setting different optical constants between the long-axis direction and the short axis direction, only the inorganic fine particle layer can also be equipped with the polarization function. However, as in this embodiment, by providing the dielectric layer and the reflection layer in addition to the inorganic fine particle layer, the contrast can be improved as compared to the case where only the inorganic fine particle layer is used. In addition, as shown in FIG. 7, on the transparent substrate 11, an inorganic fine particle layer 72, a dielectric layer 73, a reflection layer 141, a dielectric layer 142, and an inorganic fine particle layer 143 may be laminated to form a polarization layer 113. The reflection layer 141, the dielectric layer 142, and the inorganic fine particle layer 143 correspond to the reflection layer 41, the dielectric layer 42, and the inorganic fine particle layer 43 of the first polarization layer 13a and the second polarization layer 32a, respectively. With this structure, reflection of incident light from the transparent substrate 11 side can be prevented by the inorganic fine particle layer 72. In addition, by providing the dielectric layer 73, an interference effect is obtained between the reflection layer 141 and the dielectric layer 73, which can reduce a reflectance. Further, on the inorganic fine particle layers 43 and 143 of the polarization layers 13a, 32a, and 113, a lamination structure constituted of a dielectric layer and an inorganic fine particle layer may be further laminated, and another lamination structure may additionally laminated on the lamination structure. With this structure, the interference effect between the layers is increased and the contrast in the transmission axis direction at a desired wavelength is increased. At the same time, reflection components from undesirable inorganic fine particles can be reduced over a wide range in a transmissive liquid crystal display apparatus, which improves the polarization characteristics.

Second Embodiment

In the first embodiment, the materials of the inorganic fine particles used for the polarization layers corresponding to the dots of different colors of R, G, and B include the Ge component. In addition, it is also possible to change inorganic fine particles depending on the colors and provide the polarizer having polarization characteristics optimum for each color. Hereinafter, a description will be give with reference to FIGS. 1 to 4, 11, and 12. The same components as those in the first embodiment are denoted by the same symbols, and their descriptions are omitted. This embodiment is different from the first embodiment only in that the inorganic fine particle layer used for the polarization layer corresponding to each of the dots of R and G on the color filter substrate side contains the Ge component and the inorganic fine particle layer used for the polarization layer corresponding to the dot of B contains a Si (silicon) component.

Figure 11:
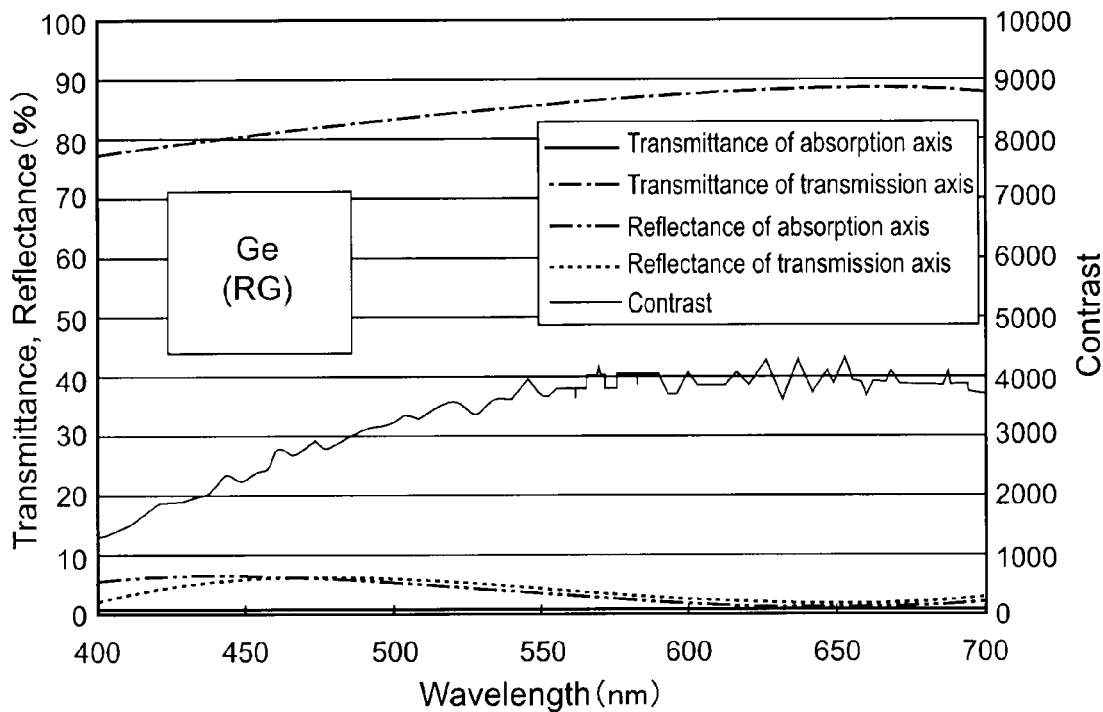
FIG. 11 is a graph showing optical characteristics in a case where Ge is used for the inorganic fine particle layer.
Figure 12:
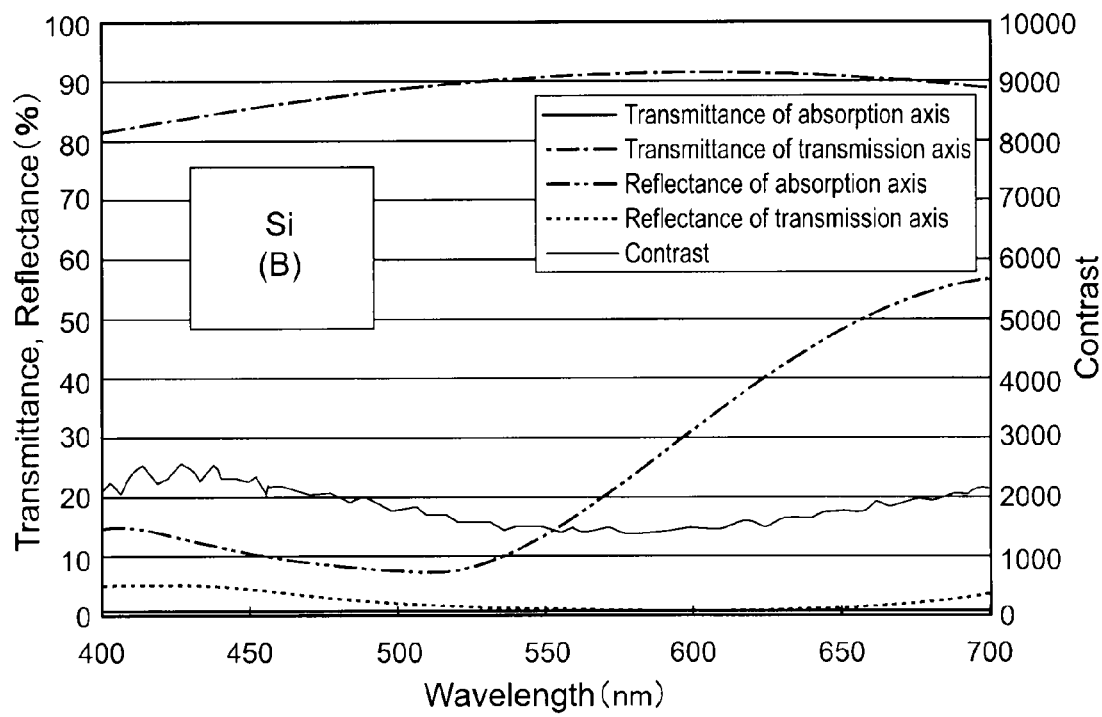
FIG. 12 is a graph showing optical characteristics in a case where Si is used for the inorganic fine particle layer.

FIG. 1 is an exploded perspective view schematically showing a liquid crystal apparatus 250, in which equivalent circuits are provided on the array substrate. FIG. 2 is a cross-sectional view of the liquid crystal cell 250 taken along the line A-A' of FIG. 1. FIG. 3 is a partial schematic plan view showing a positional relationship among components formed on a color filter substrate 210 of the liquid crystal apparatus shown in FIG. 1. FIGS. 11 and 12 are graphs each showing optical characteristics in a case where polarization elements that form the polarization layer constituted of the reflection layer, the dielectric layer, and the inorganic fine particle layer on the substrate are irradiated with light from the inorganic fine particle layer side. As the material of the inorganic fine particle, Ge is used in FIG. 11, and Si is used in FIG. 12.

As shown in FIGS. 1 and 2, a color TFT liquid crystal apparatus 201 includes the liquid crystal cell 250 and the back light 60 for irradiating the liquid crystal cell 250 with light. The liquid crystal cell 250 is obtained by sandwiching the twisted nematic liquid crystal layer 40 between the pair of the color filter substrate 210 and the array substrate 20 disposed with a predetermined gap.

As shown in FIGS. 1 to 3, the color filter substrate 210 is provided with a first polarizer 270 on a surface of the transparent substrate 11 on the liquid crystal layer 40 side. The first polarizer 270 is constituted of a first R polarization layer group 213R, a first G polarization layer group 213G, and a first B polarization layer group 213B that are formed for each dot region 12a. The first R polarization layer group 213R is constituted of a plurality of first R polarization layers 213Ra corresponding to dots of R. The first G polarization layer group 213G is constituted of a plurality of first G polarization layers 213Ga corresponding to dots of G. The first B polarization layer group 213B is constituted of a plurality of first B polarization layers 213Ba corresponding to dots of B. The polarization layers 213Ra, 213Ga, and 213Ba are each formed of the reflection layer, the dielectric layer, and the inorganic fine particle layer as in the first embodiment. As the material of the inorganic fine particle, Ge is used for the first R polarization layer 213Ra and the first G polarization layer 213Ga, and Si is used for the first B polarization layer 213Ba.

In this way, the first polarizer 270 of the color filter substrate 210 as the substrate on a light exit side from the back light 60 is caused to have the above-described structure, thereby making it possible to further optimize the polarization characteristics and obtain a liquid crystal apparatus excellent in display characteristics. Specifically, as shown in FIG. 11, in a case where Ge is used as the material of the inorganic fine particle, the contrast is obtained over an entire visible light range and the reflectance is low. Therefore, when the same material of the inorganic fine particle is used for R, G, and B, it is effective to use Ge. However, when Ge is used, a transmittance is likely to slightly deteriorate in the blue region. In contrast, when Si is used as shown in FIG. 12, higher transmittance can be obtained than the case of Ge in a blue wavelength range (about 450 nm). In view of this, in this embodiment, Ge is used for the material of the inorganic fine particle corresponding to the dots of R and G, and Si is used for the material of the inorganic fine particle corresponding to the dots of B. As a result, an amount of light that passes through a blue colored layer in the liquid crystal apparatus 1 can be increased as compared to the case where Ge is used therefor, and the liquid crystal apparatus having the polarizer that is more excellent in the polarization characteristics can be obtained. Further, the display characteristics can be improved.

The inorganic fine particle layer of the polarizers whose materials of the inorganic fine particles are different for each color as described above can be manufactured as follows. Hereinafter, a description will be given with reference to FIG. 13.

Figure 13:
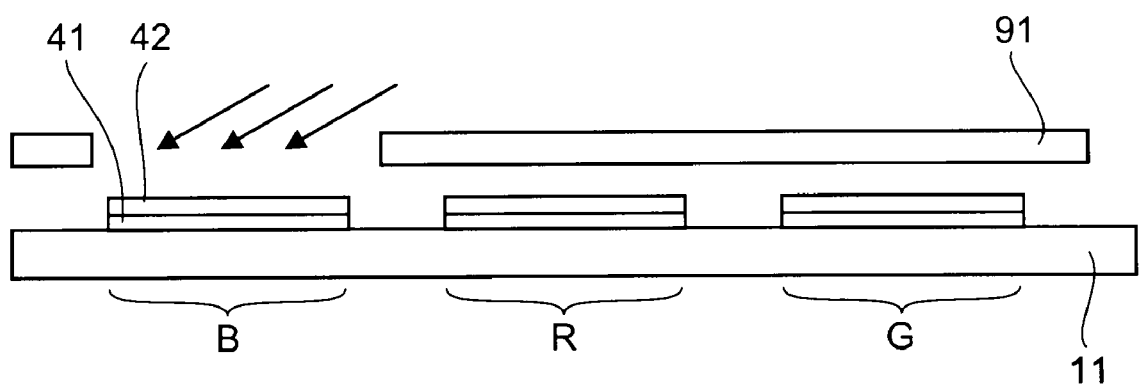
FIG. 13 is a diagram showing a state of forming an inorganic fine particle layer in a second embodiment.

FIG. 13 is a schematic diagram showing a state of forming the inorganic fine particle layer.

As shown in FIG. 13, the reflection layers 41 and the dielectric layers 42 are formed on the transparent layer 11. Then, a mask 91 is provided so that only the reflection layer 41 and the dielectric layer 42 corresponding to the B dot are exposed, and Si is sputtered by the ion sputtering. After that, a mask is provided so that only the reflection layers 41 and the dielectric layers 42 corresponding to the R dot and the G dot are exposed, and Ge is sputtered by the ion sputtering.

As described above, in this embodiment, the polarization layer group is independently provided for each dot region. Therefore, in order to obtain desirable polarization characteristics, the optimum material of the inorganic fine particle can be selected differently from each other.

In this embodiment, in the first polarizer 270 on the color filter substrate 220 side, the materials of the inorganic fine particles are set to be different depending on the colors, but the polarizer on the array substrate side may have the same structure. Alternatively, the materials of the inorganic fine particles may be set to be different only in the polarizer on the array substrate side.

MODIFIED EXAMPLE

Hereinafter, a modified example will be described. The same components as those in the above embodiment are denoted by the same symbols and their descriptions are omitted.

In the above embodiments, the polarizer is disposed on the array substrate so that the longitudinal direction of the polarization layer is in parallel to the signal lines (y-axis direction), and on the color filter substrate, the polarizer having the polarization layer, the longitudinal direction of which is perpendicular to the longitudinal direction of the polarization layer of the polarizer disposed on the array substrate is disposed. In contrast, on the array substrate, the polarizer may be disposed on the array substrate so that the longitudinal direction of the polarization layer is in parallel to the scanning lines (x-axis direction), and on the color filter substrate, the polarizer having the polarization layer, the longitudinal direction of which is perpendicular to the longitudinal direction of the polarization layer of the polarizer disposed on the array substrate may be disposed.

In the above embodiments, the pair of the polarizers is perpendicular to each other. Alternatively, the polarizer according to the present invention can of course be applied to a normally black mode in which the polarizers are disposed in parallel to each other.

In the above embodiments, the pitches and lengths of the polarization layers corresponding to each dot of R, G, and B are set to be the same. Alternatively, the pitches and lengths may be designed so that desirable polarization characteristics can be obtained for each color and may be set to be different depending on colors.

In the above embodiments, the polarization layer group is provided for one dot. Alternatively, for example, the polarization layer group may be provided for a plurality of dots, as shown in FIGS. 14 and 15.

Figure 14:
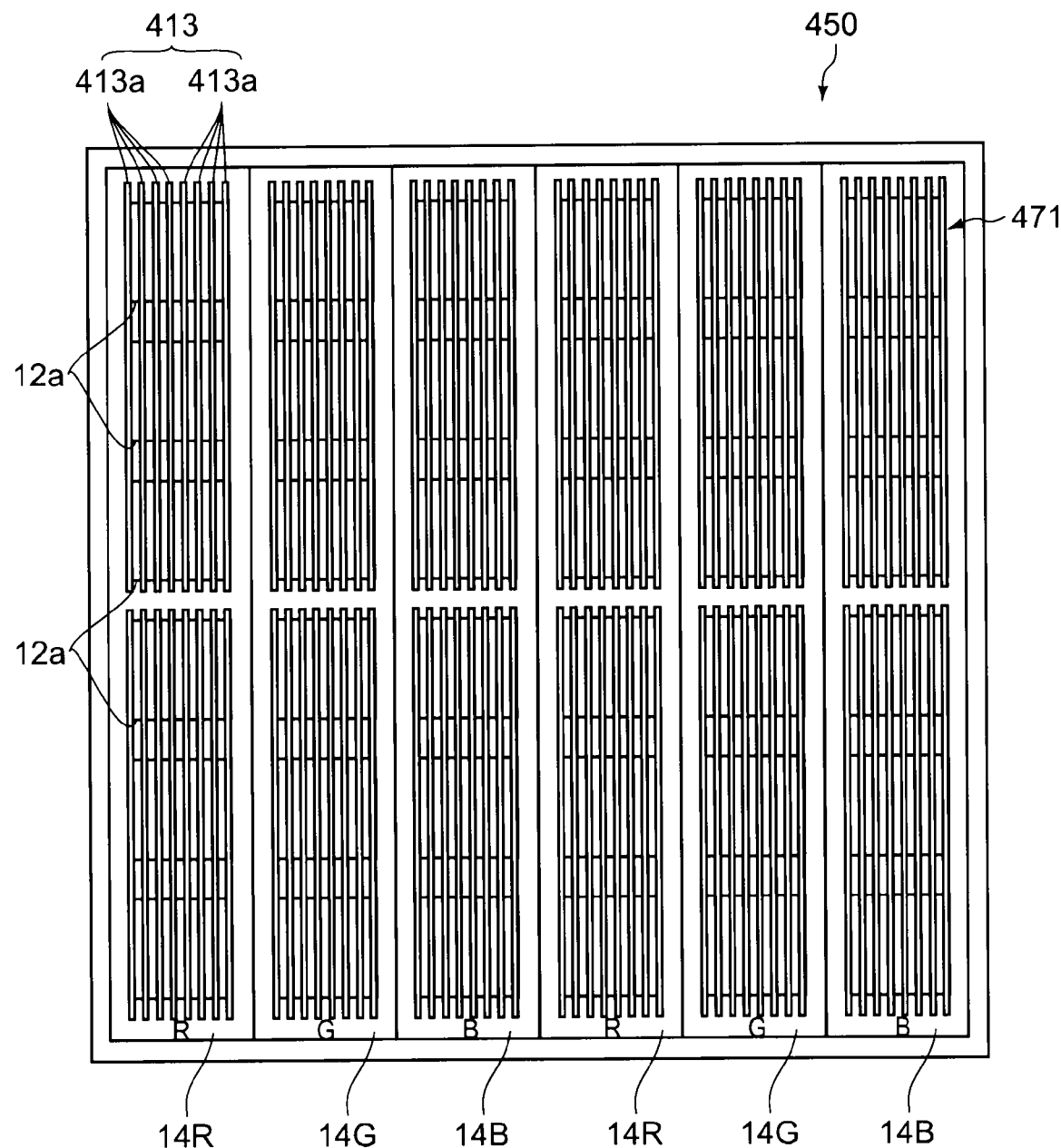
FIG. 14 is a schematic plan view showing a liquid crystal apparatus as a modified example.
Figure 15:
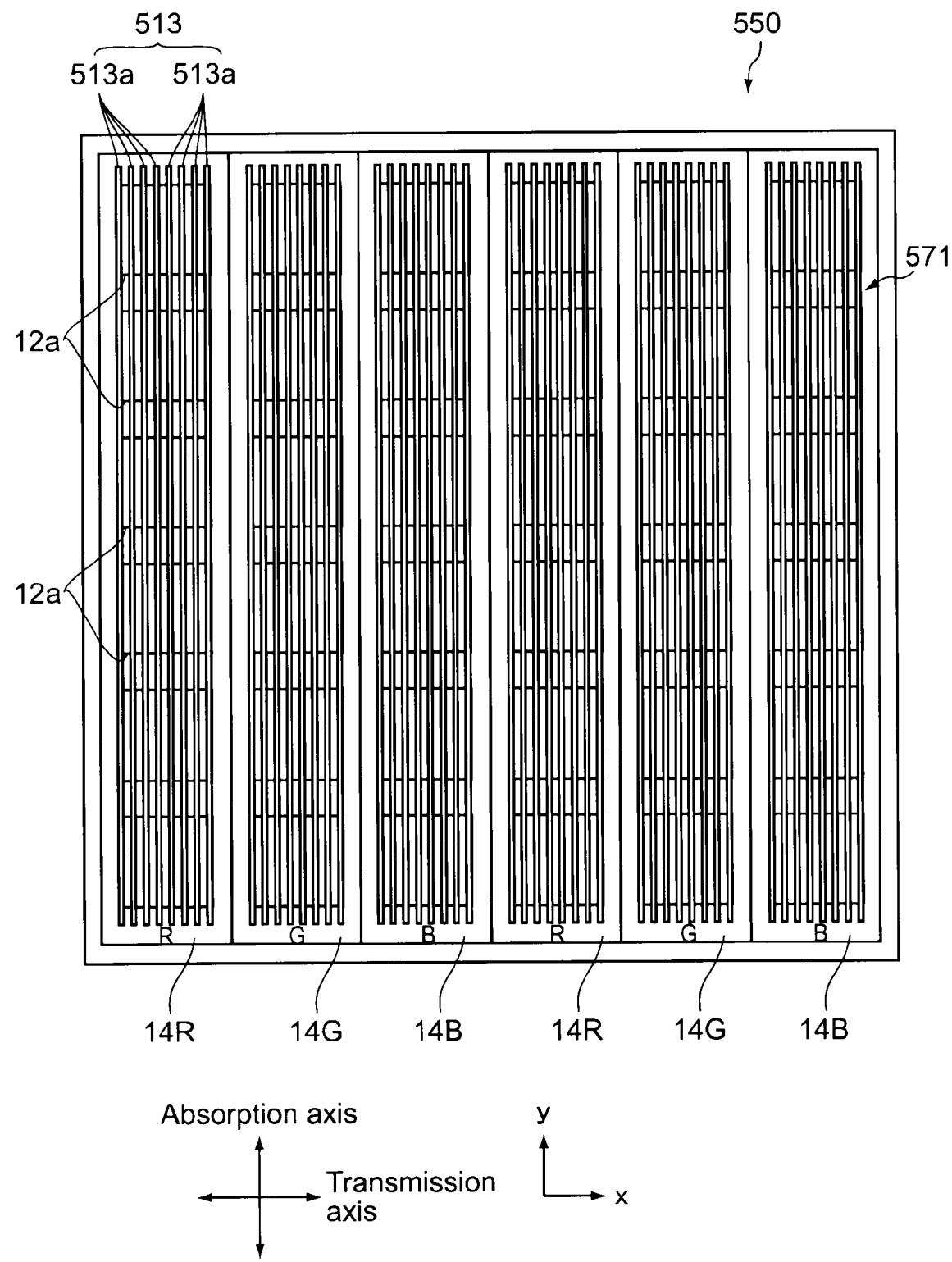
FIG. 15 is a schematic plan view showing a liquid crystal apparatus as another modified example.

FIGS. 14 and 15 are schematic plan views each showing a liquid crystal apparatus. In FIGS. 14 and 15, a positional relationship among a colored layer, a dot region, and a polarizer on one side (polarizer on the array substrate side in this case) is shown.

As shown in FIG. 14, in a liquid crystal apparatus 450, a polarizer 471 has a structure in which one polarization layer group 413 corresponds to a plurality of (three in this case) dots of the same color that are adjacent to each other. The polarization layer group 413 has a plurality of polarization layers 413a each having a longitudinal direction in the y-axis direction. A structure of the polarization layer 413a is the same as that of the polarization layer in the above embodiments. In this case, a polarizer (not shown) opposed to the polarizer 471 includes polarization layers each having a longitudinal direction in the x-axis direction. In a case, for example, where the materials of the inorganic fine particles are set to be different depending on colors as in the second embodiment, the polarizer opposed to the polarizer 471 only has to have a structure in which the polarization layer group is independently disposed for each dot as in the case of the polarizer disposed on the color filter substrate in the second embodiment. Alternatively, one polarization layer group may be disposed so as to correspond to the plurality of dots corresponding to R and G whose materials of the inorganic fine particles are the same.

As shown in FIG. 15, in a liquid crystal apparatus 550, a polarizer 571 has a structure in which one polarization layer group 513 corresponds to entire dots corresponding to the one-color stripe-shaped colored layer 14R (14G or 14B). The polarization layer group 513 includes a plurality of polarization layers 513a having a longitudinal direction in the y-axis direction. Accordingly, the polarization layer groups are disposed on the substrate in stripes. The structure of the polarization layer 513a is the same as that of the polarization layer in the above embodiments. In this case, a polarizer (not shown) opposed to the polarizer 571 includes polarization layers each having a longitudinal direction in the x-axis direction. In a case, for example, where the materials of the inorganic fine particles are set to be different depending on colors as in the second embodiment, the polarizer only has to have a structure in which the polarization layer group is independently disposed for each dot as in the case of the polarizer disposed on the color filter substrate in the second embodiment.

In addition, as described above, in the case where the transparent substrate has a large size, the surface of the substrate is divided into a plurality of regions, and an exposure process at the time of mask formation by the photolithography can be carried out for each divided region. One polarization layer group may be provided for each of the plurality of dot regions so that one polarization layer group corresponds to each of the divided regions. That is, the adjacent polarization layer groups are set apart from each other.

In this way, the polarization layer is independently provided for each of the plurality of dot regions. Therefore, even in a large-screen liquid crystal apparatus such as a large-sized liquid crystal television, a screen thereof can be divided to form the polarization layer for each divided region, with the result that a liquid crystal apparatus having uniform polarization characteristics in the surface thereof can be stably obtained. In addition, the polarization layer having the polarization function is provided in the liquid crystal cell instead of externally providing a polarizing plate, and thus the reduction in thickness and weight can be achieved.

Figure 16:
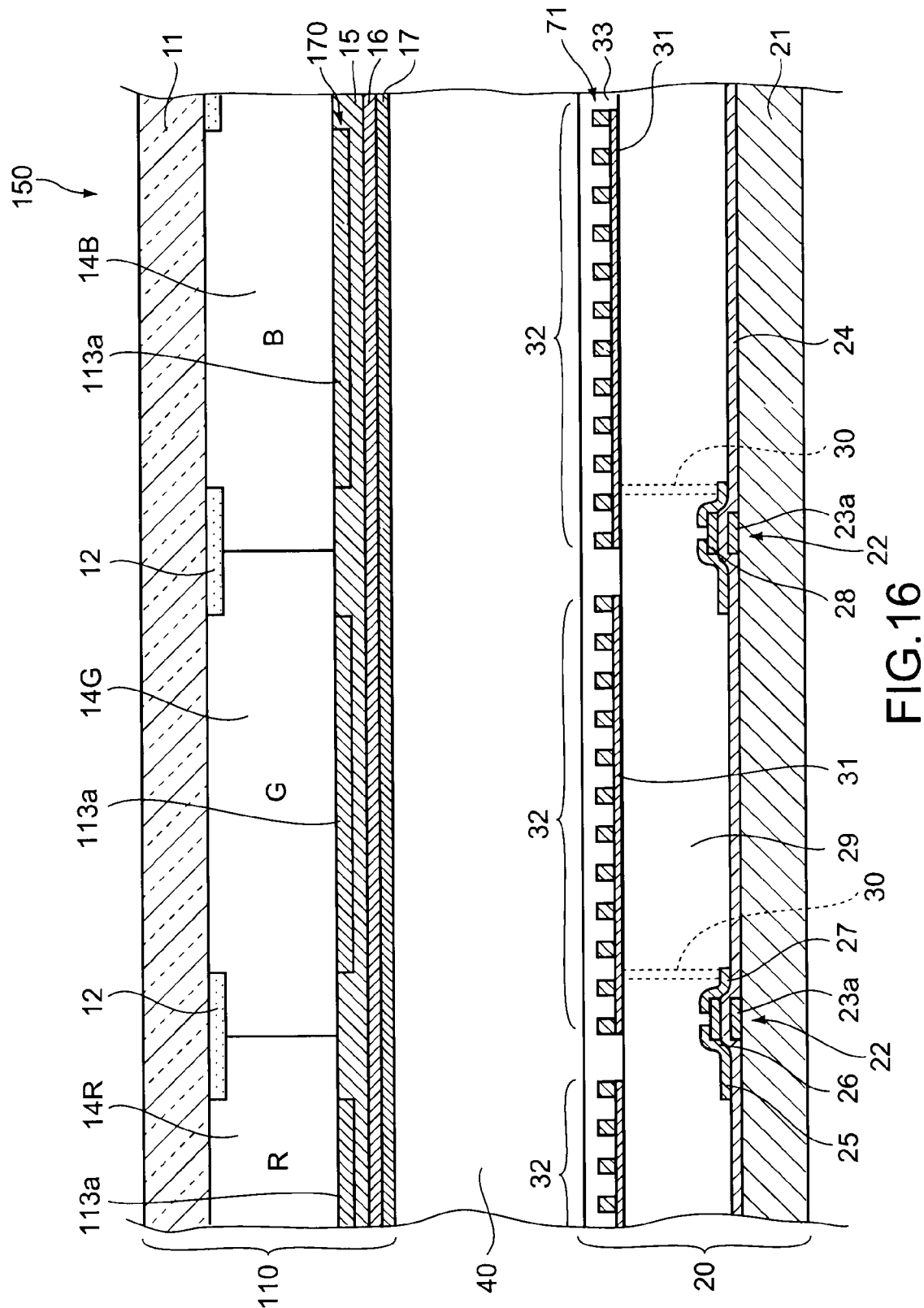
FIG. 16 is a schematic cross-sectional view showing a liquid crystal apparatus as another modified example.

Further, in the above embodiments, the first polarizer 70 on the color filter substrate 10 is disposed between the transparent substrate 11 and the colored layers 14R, 14G, and 14B. Alternatively, as in a case of a color filter substrate 110 of a liquid crystal cell 150 shown in FIG. 16, a first polarizer 170 may be disposed between the colored layers 14R, 14G, and 14B and the overcoat layer 15. Alternatively, the polarizer may be disposed between the overcoat layer 15 and the pixel electrode 16 or between the pixel electrode 16 and the alignment layer 17. When the polarizer is formed, it is desirable that a layer as a base is flat. Further, in the above embodiments, the second polarizer 71 on the array substrate 20 is disposed between the pixel electrode 31 and the alignment layer 33 but may instead be disposed directly above the transparent substrate 21 or disposed between the gate insulation film 24 and the interlayer insulator 29 or between the interlayer insulator 29 and the pixel electrode 31 before the gate electrode and the scanning lines are formed.

As described above, when disposed so as to sandwich the liquid crystal layer 40, the pair of polarizers functions as the polarizers, and therefore the position of the polarizers can be arbitrarily selected. It should be noted that a state where the alignment layer is in contact with the liquid crystal layer is desirable because the alignment layer controls inclinations of the liquid crystal molecules in the liquid crystal layer. Therefore, it is undesirable that the polarizer is disposed between the alignment layer and the liquid crystal layer.

Figure 17:
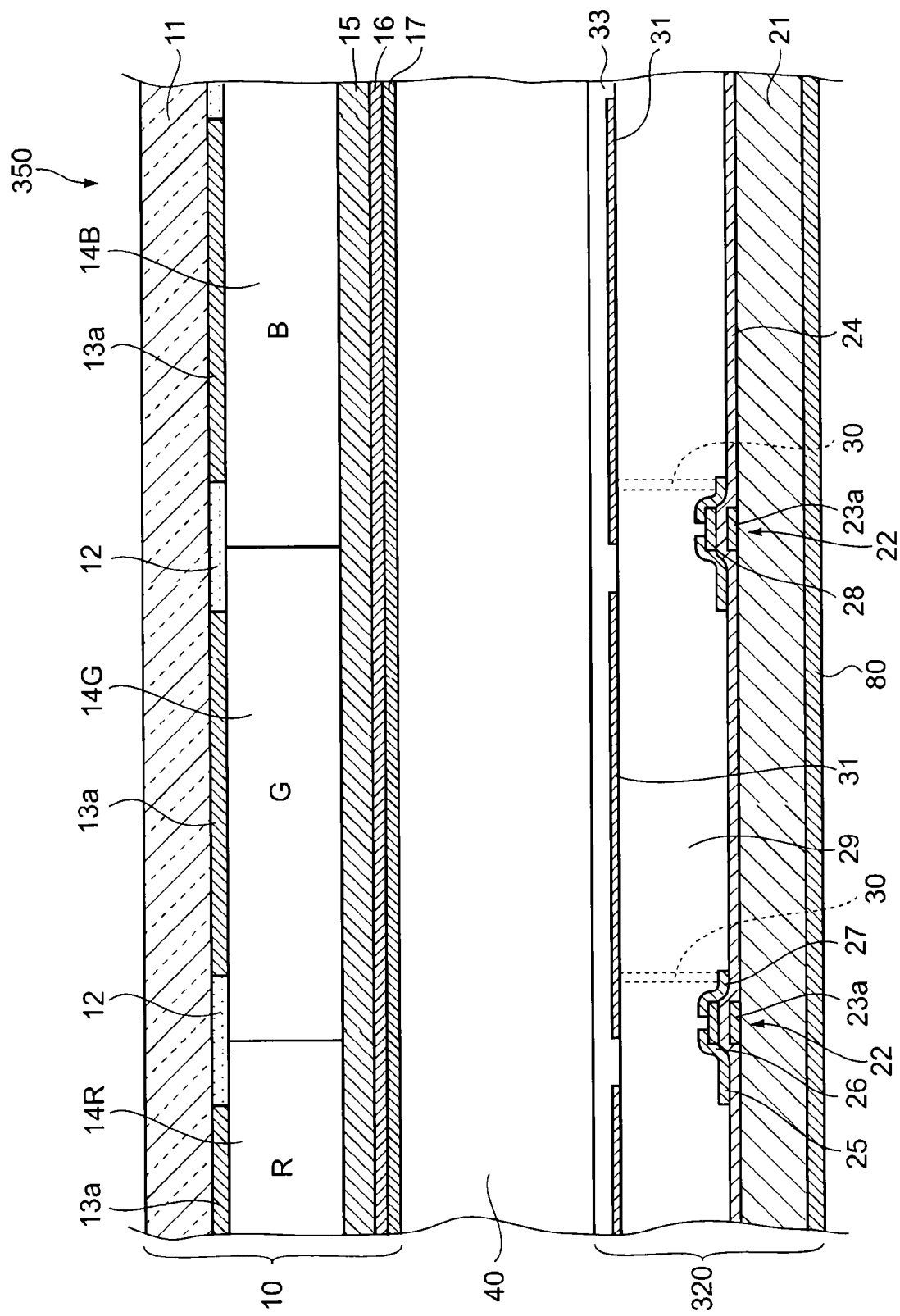
FIG. 17 is a schematic cross-sectional view showing a liquid crystal apparatus as another modified example.
Figure 18:
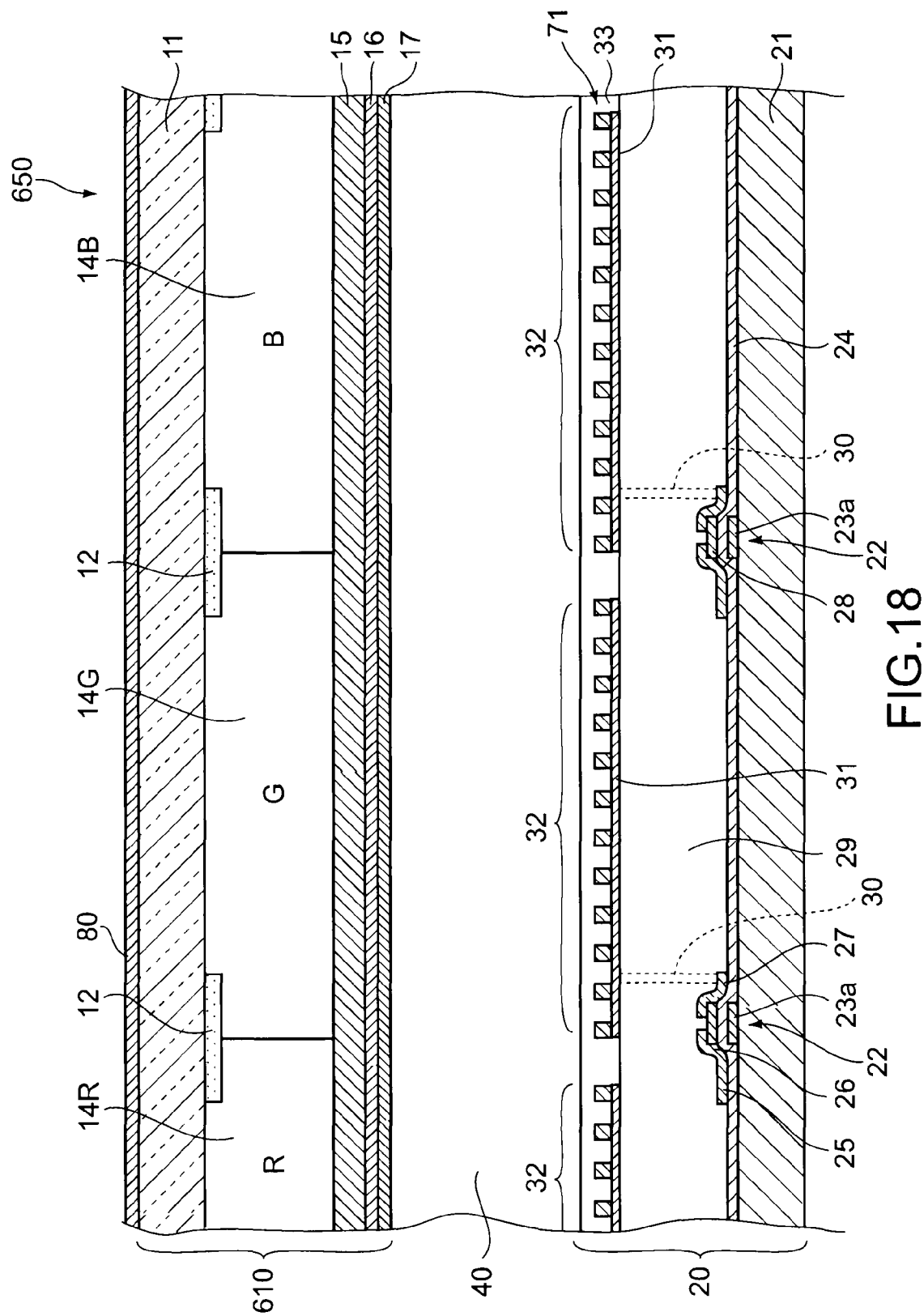
FIG. 18 is a schematic cross-sectional view showing a liquid crystal apparatus as another modified example.

Further, in the above embodiments, the pair of the polarizers is disposed in the liquid crystal cell. Alternatively, like a liquid crystal cell 350 shown in FIG. 17, a polarizer on an array substrate 320 side is not provided in the liquid crystal cell, and a dichroic polarizing plate 80 obtained by causing an iodine or dye-based organic polymeric material to be contained in a film generally used may be externally provided to the liquid crystal cell. Alternatively, like a liquid crystal cell 650 shown in FIG. 18, a polarizer on a color filter substrate 610 side is not provided in the liquid crystal cell, and the polarizing plate 80 may be externally provided to the liquid crystal cell. With those structures, it is also possible to reduce in thickness and weight as compared to a typical structure in which polarizing plates are provided on both surfaces of the liquid crystal cell.

Figure 19A:
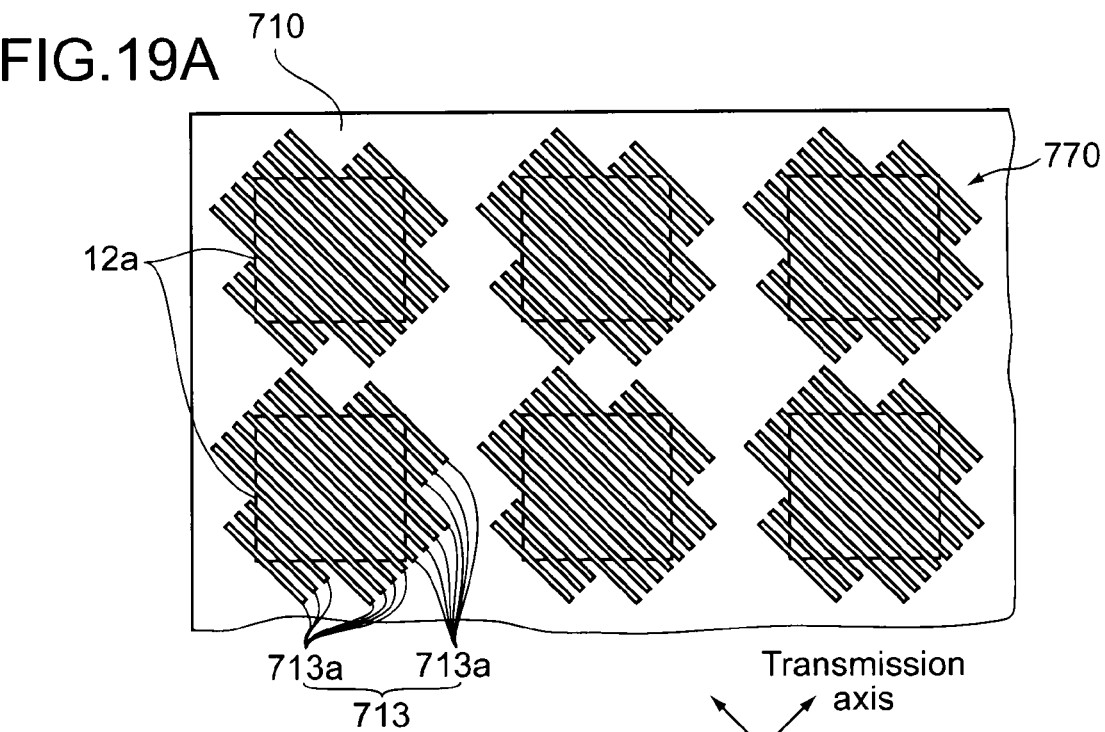
FIGS. 19A and 19B are schematic plan views showing a color filter substrate and an array substrate as another modified example, respectively.
Figure 19B:
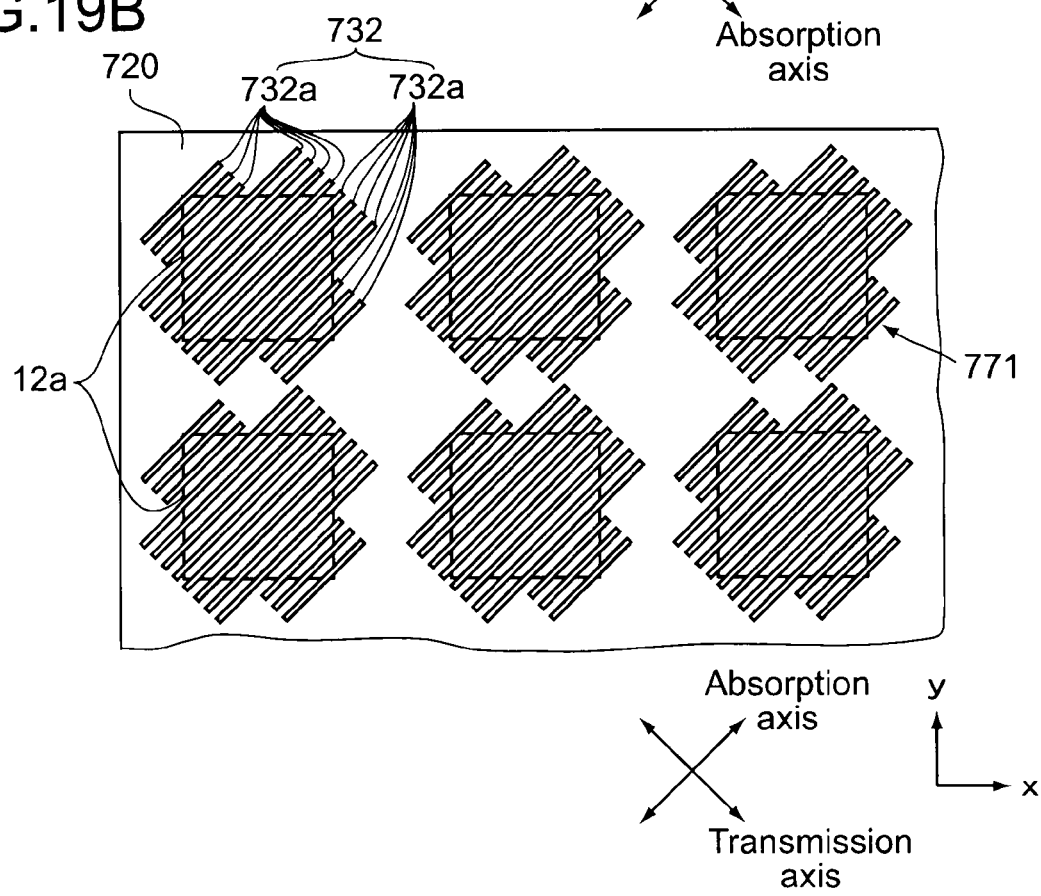

Further, in the above embodiments, the longitudinal directions of the polarization layers constituting the polarizer correspond to x-axis direction and y-axis direction, respectively. Alternatively, the longitudinal direction of the polarization layer may be set so as to incline by 45 degrees with respect to the x-axis direction as shown in FIGS. 19A and 19B. FIGS. 19A and 19B are schematic plan views showing a color filter substrate 710 and a array substrate 720 that constitute one liquid crystal apparatus, respectively. In each of FIGS. 19A and 19B, the arrangement of polarizers is shown. To facilitate visualization, in the colored layer, the signal lines and the like are not shown, and only a positional relationship with the dot regions 12a is shown.

As shown in FIG. 19A, a first polarizer 770 formed by disposing a first polarization layer group 713 is provided on a color filter substrate 710 for each of the plurality of dot regions 12a. As shown in FIG. 19B, a polarizer 771 formed by disposing a second polarization layer group 732 is provided on an array substrate 720 for each of the plurality of dot regions 12a. The first polarization layer group 713 (second polarization layer group 732) has a structure in which a plurality of stripe-shaped first polarization layers 713a (second polarization layers 732a) are arranged in parallel. A longitudinal direction of the polarization layer corresponds an absorption axis, and a direction perpendicular to this axis corresponds to a transmission axis. The transmission axes of the first polarizer 770 and the second polarizer 771 are perpendicular to each other. When the liquid crystal apparatus is manufactured, the first polarization layer group 713 and the second polarization layer group 732 each covers the dot region 12a, and outlines of the first polarization layer group 713 and the second polarization layer group 732 are positioned outside an outline of the dot region 12a in a plan view thereof.

Further, in the above embodiments, in one dot region 12a, the plurality of polarization layers are regularly formed only in one direction on the surface of the substrate. Alternatively, as shown in FIGS. 20A and 20B, the plurality of polarization layers may be regularly formed in two directions perpendicular to each other.

Figure 20A:
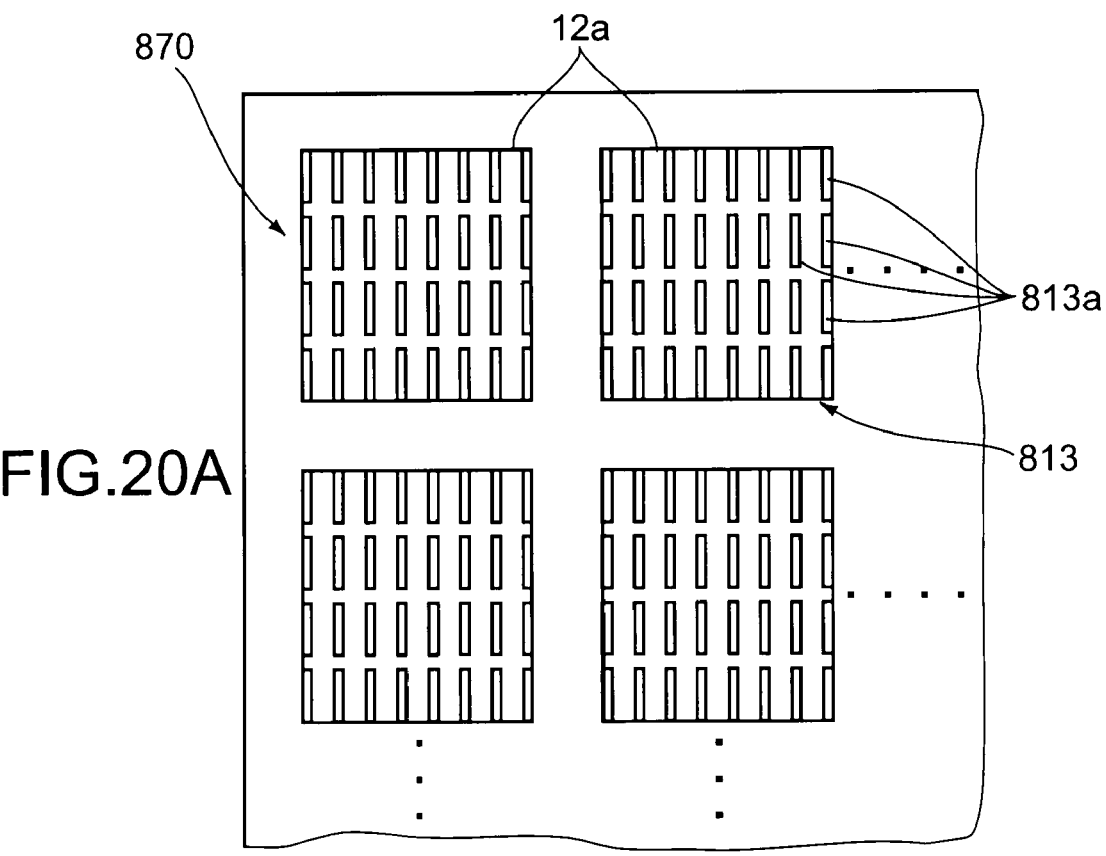
FIGS. 20A and 20B are schematic plan views showing a color filter substrate and an array substrate as another modified example, respectively.
Figure 20B:
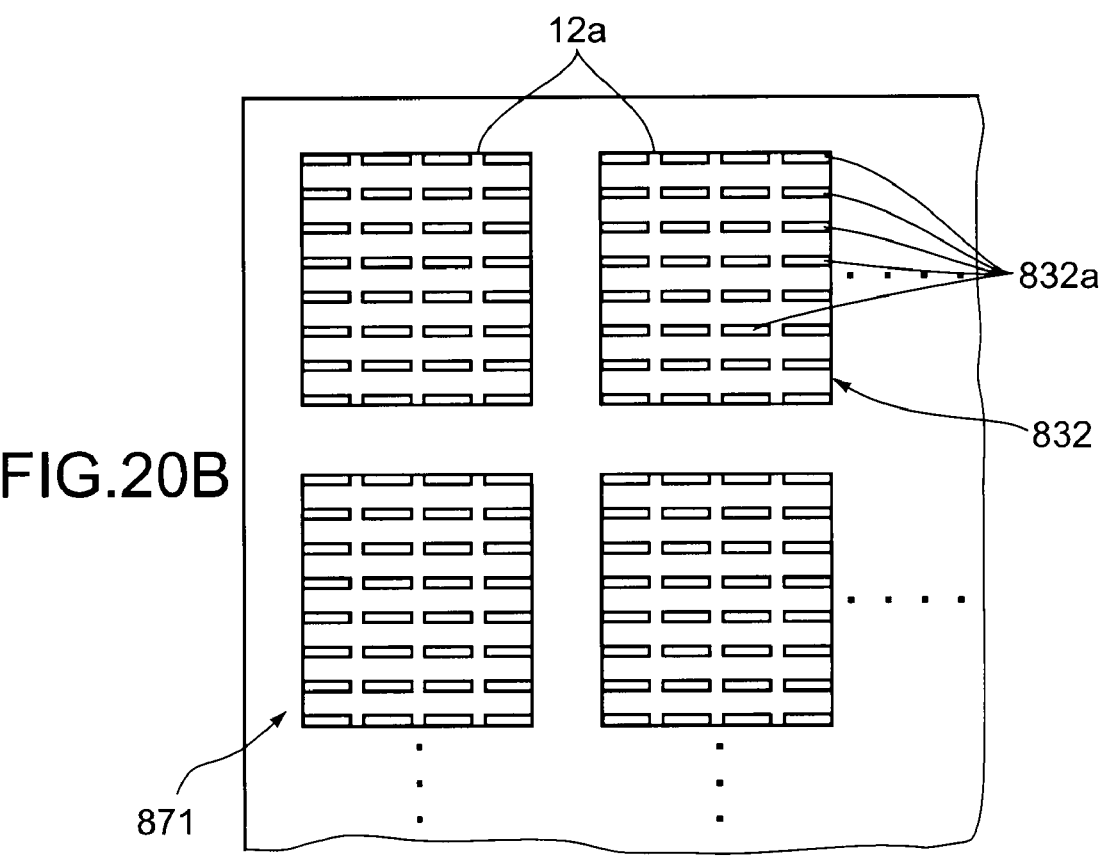

FIGS. 20A and 20B are schematic plan views respectively showing a color filter substrate 810 and an array substrate 820 that constitute one liquid crystal apparatus. FIGS. 20A and 20B each show an arrangement of polarizers. To facilitate visualization, wirings of signal lines and a colored layer are not shown, and only a positional relationship with the dot regions 12a is shown.

As shown in FIG. 20A, first polarizers 870 formed by disposing first polarization layer groups 813 for each of the plurality of dot regions 12a are provided on a color filter substrate 810. As shown in FIG. 20B, polarizers 871 formed by disposing second polarization layer groups 832 for each of the plurality of dot regions 12a are provided on an array substrate 820. In the liquid crystal apparatus shown in FIGS. 20A and 20B, the stripe-shaped polarization layers according to the first embodiment are divided into a plurality of island shapes in a longitudinal direction thereof. The first polarization layer group 813 has a structure in which stripe-shaped first polarization layers 813a are divisionally arranged in island shapes in 8×4 in number in FIG. 20A. The second polarization layer group 832 has a structure in which stripe-shaped second polarization layers 832a are divisionally arranged in island shapes in 4×8 in number in FIG. 20B. In this way, with respect to one dot region 12a, the polarizer may be structured so that the plurality of polarization layers are arranged in both the x-axis direction and the y-axis direction.

In the above embodiments, the colored layers are used to obtain a color display. In addition, the present invention can be applied to a case where a phosphor layer is used for the color display instead of the colored layer. The colored layer made of a generally-used organic resin in which the pigment is dispersed causes a large loss of light when light passes through the colored layer. But, in the case where the phosphor layer is used, the loss of light can be significantly reduced, which can realize a high contrast display. In this case, in a structure in which the phosphor layer is provided on the transparent substrate opposed to the transparent substrate disposed on the back light side, out of the two transparent substrates constituting the liquid crystal apparatus, it may be necessary to dispose the polarizer so that light from the back light enters the phosphor layer after passing through the polarizer on the substrate on the side on which the phosphor layer is provided. When light from the back light passes through the polarizer after passing through the phosphor layer, the polarization of light is disturbed due to the passing through the phosphor layer. As a result, the loss of light is caused when passing through the polarizer. In contrast, in the case where light passes through the polarizer and the phosphor layer in the stated order, even when the polarization of light is disturbed in the phosphor layer, the loss of light is not caused because light does not pass through the polarizer thereafter.

Further, in the above embodiments, the dimensions including the pitches of the polarization layers constituting the polarization layer group are the same regardless of the colors. Alternatively, the dimensions may be changed depending on the colors so as to obtain optimum polarization characteristics.

The present application contains subject matter related to that disclosed in Japanese Priority Patent Application JP 2008-136530 filed in the Japan Patent Office on May 26, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal apparatus including a plurality of dot regions, comprising:
   a pair of transparent substrates disposed with a gap;
   a liquid crystal layer sandwiched by the pair of transparent substrates;
   a polarizer formed by disposing, on at least one of surfaces of the pair of transparent substrates which are opposed to each other, a polarization layer group constituted of a plurality of polarization layers including an inorganic fine particle layer having a shape anisotropy, the polarization layer group corresponding to one of the dot region and the plurality of dot regions,
   a plurality of colored layers disposed on one of the pair of transparent substrates, the plurality of colored layers corresponding to the plurality of dot regions,
   wherein the inorganic fine particle layer is formed of an inorganic fine particle that is different depending on colors of the plurality of colored layers.

2. The liquid crystal apparatus according to claim 1,
   wherein the plurality of colored layers have colors of red, green, and blue,
   wherein the inorganic fine particle corresponding to each of the colored layers of red and green contains a Ge component, and
   wherein the inorganic fine particle corresponding to the colored layer of blue contains a Si component.

3. The liquid crystal apparatus according to claim 2,
   wherein the plurality of polarization layers each include
      a reflection layer,
      a dielectric layer formed on the reflection layer, and
      the inorganic fine particle layer formed on the dielectric layer.

4. The liquid crystal apparatus according to claim 3,
wherein the polarizer is disposed on each of the surfaces of the pair of transparent substrates which are opposed to each other.

5. A liquid crystal apparatus including a plurality of dot regions, comprising:
a pair of transparent substrates disposed with a gap;
a liquid crystal layer sandwiched by the pair of transparent substrates; and
a polarizer formed by disposing, on at least one of surfaces of the pair of transparent substrates which are opposed to each other, a polarization layer group constituted of a plurality of polarization layers including an inorganic fine particle layer having a shape anisotropy, the polarization layer group corresponding to one of the dot region and the plurality of dot regions,
colored layers of red, green, and blue disposed on one of the pair of transparent substrates, the colored layers corresponding to the dot regions,
wherein the inorganic fine particle layer is formed of an inorganic fine particle that contains a Ge component.

* * * * *